(12) United States Patent
Takiguchi et al.

(10) Patent No.: US 6,243,103 B1
(45) Date of Patent: *Jun. 5, 2001

(54) PANORAMIC IMAGE GENERATION IN DIGITAL PHOTOGRAPHY

(75) Inventors: Hideo Takiguchi, Kawasaki; Kotaro Yano, Yokohama; Tatsushi Katayama, Tokyo; Kenji Hatori, Hatogaya, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/864,480

(22) Filed: May 28, 1997

(30) Foreign Application Priority Data

May 28, 1996 (JP) .................................... 8-133640

(51) Int. Cl.[7] ....................................... G06K 9/36
(52) U.S. Cl. ............................ 345/435; 382/284
(58) Field of Search .................... 345/435, 418, 345/433, 434, 439; 382/284

(56) References Cited

U.S. PATENT DOCUMENTS

| 4,868,642 | * | 9/1989 | Kaneko | 358/527 |
|---|---|---|---|---|
| 5,392,388 | * | 2/1995 | Gibson | 345/339 |
| 5,444,478 | * | 8/1995 | Lelong et al. | 348/39 |
| 5,524,071 | * | 6/1996 | Yokomizo | 382/248 |
| 5,650,814 | * | 7/1997 | Florent et al. | 348/39 |
| 5,680,150 | * | 10/1997 | Shimizu et al. | 345/438 |
| 5,706,419 | * | 1/1998 | Matsugu et al. | 345/435 |
| 5,724,579 | * | 3/1998 | Suzuki | 707/104 |
| 5,764,236 | * | 6/1998 | Tanaka et al. | 345/429 |
| 5,774,754 | * | 6/1998 | Ootsuka | 396/380 |

* cited by examiner

Primary Examiner—Mark Zimmerman
Assistant Examiner—Cliff N. Vo
(74) Attorney, Agent, or Firm—Morgan & Finnegan LLP

(57) ABSTRACT

An image synthesizing system comprising a digital camera and a personal computer. When a first image is picked up by the camera, the personal computer takes the image sensed by the camera and a reduced image of the picked-up image. While the camera is moving, the camera sequentially sends reduced images to the personal computer, and the personal computer inputs the reduced images. The personal computer determines whether an image which is currently sensed by the camera is suitable for being synthesized into a panoramic image or not on the basis of an overlapping area between the first reduced image and a current reduced image, and a determined result is notified to a user.

18 Claims, 16 Drawing Sheets

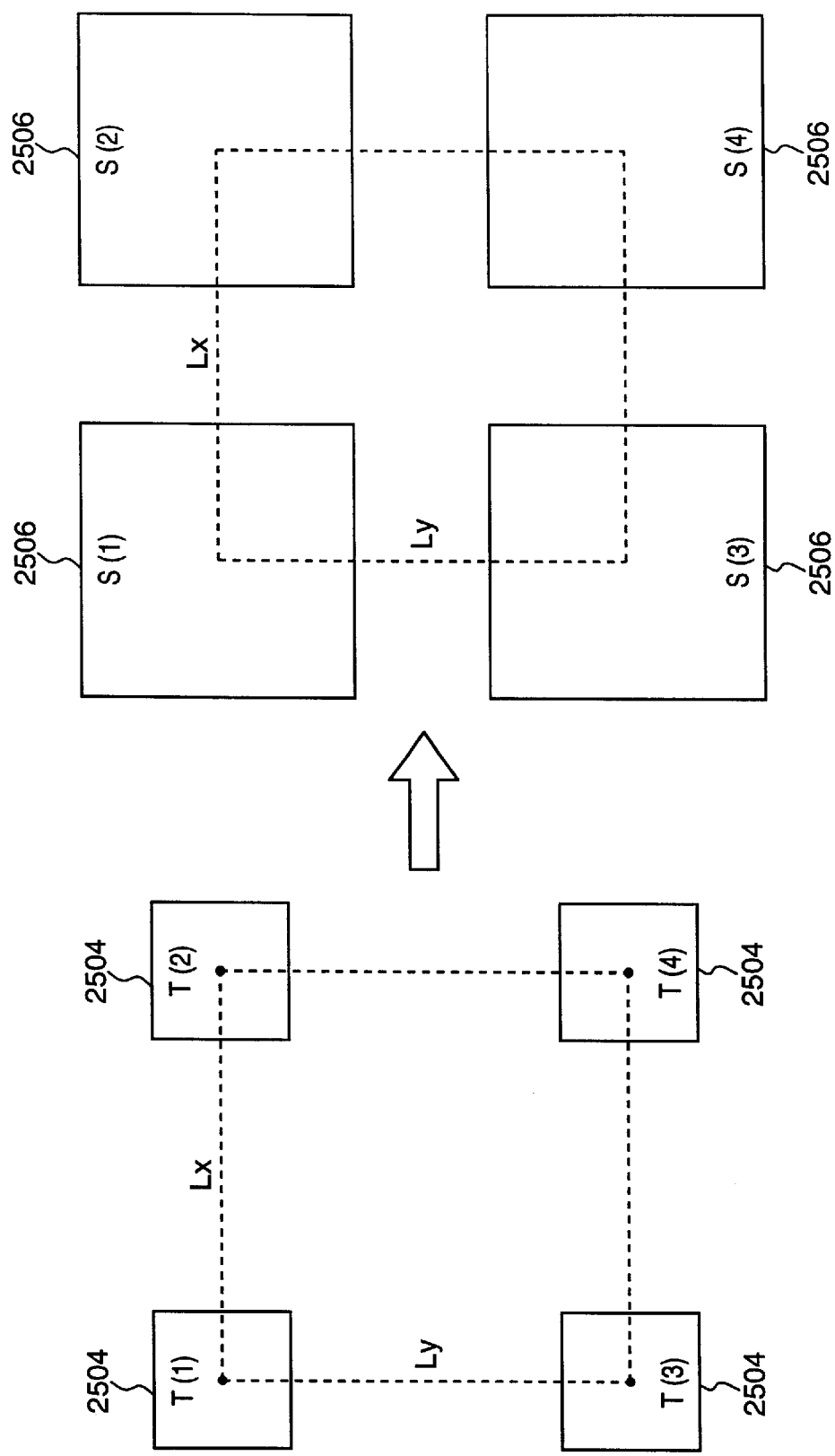

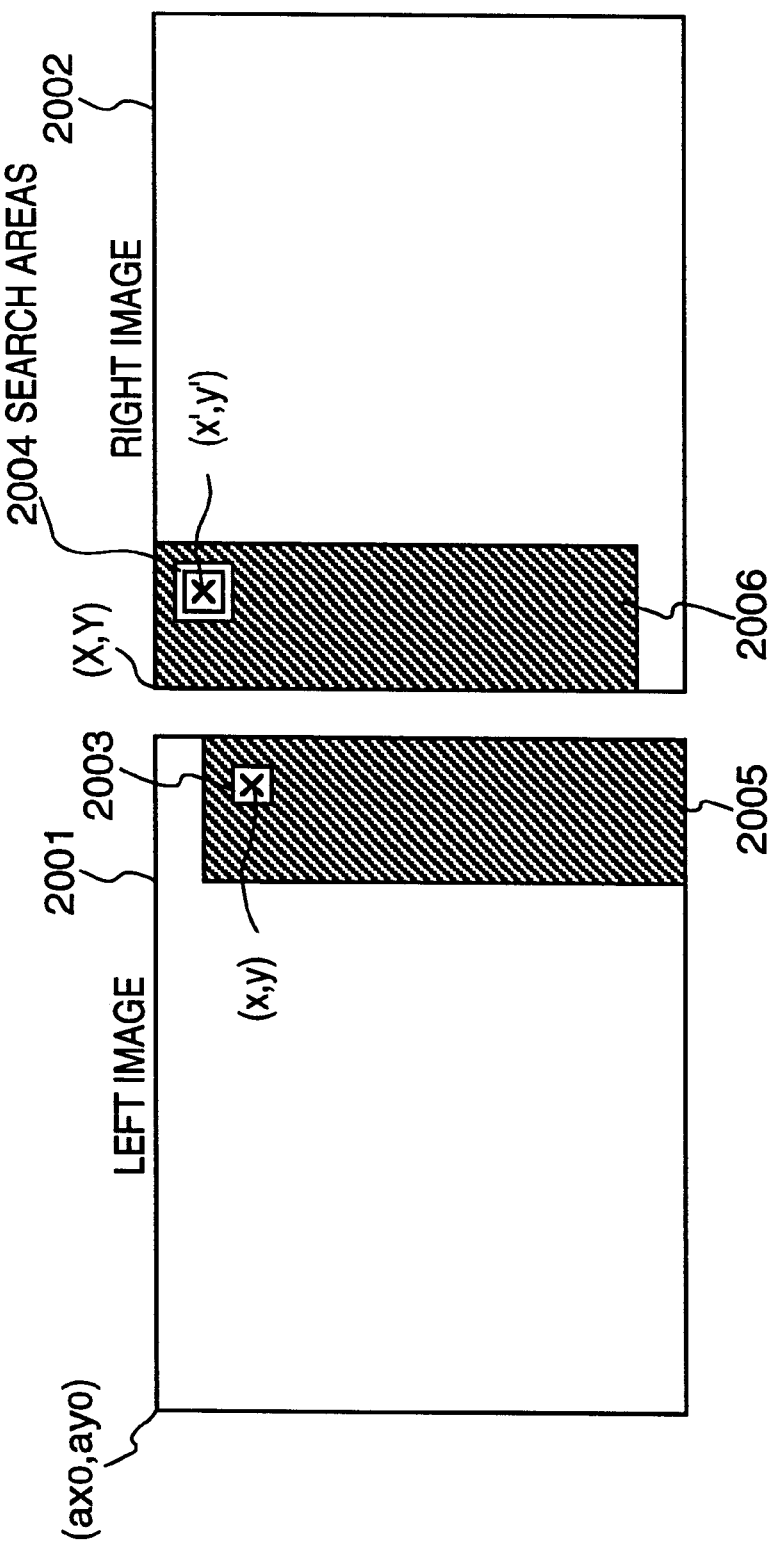

PANORAMIC IMAGE GENERATION IN DIGITAL PHOTOGRAPHY

BACKGROUND OF THE INVENTION

The present invention relates to an image synthesizing apparatus for synthesizing a plurality of images, recorded by an electronic camera, having overlapping portions, on a computer, an image sensing apparatus used in combination with the image synthesizing apparatus, and an image synthesizing system using these apparatuses. More specifically, the present invention relates to automatic determination of timing for recording an image or images taken in series (image or images to be combined with an image or images which have already been recorded).

Processing for obtaining a wide angle image by synthesizing a plurality of images having overlapping portions using a computer is called "panoramic image synthesizing processing". This processing is to obtain a single image of stretched scenery or a single wide image.

The resolution of an electronic camera is lower than that of a silver halide camera or an image scanner (i.e., the number of pixels of the electronic camera is small), which is a defect of an electronic camera. Because of this defect, it is necessary to synthesize images recorded by an electronic camera into a panoramic image in order to obtain a wide image as well as an image of high resolution. An image of wider angle of view obtained in one shot with the electronic camera would provide lower the resolution than an image having normal width. In contrast, by sensing a single object (original image) in a plurality of shots, or sensing a scenery in a plurality of shots by shifting image sensing positions in the horizontal direction, the recorded image as a whole has as high resolution than that of an image sensed by a scanner or a silver halide camera.

Meanwhile, some panoramic image synthesizing systems have been configured with electronic cameras and personal computers connected to each other, which inputs images from the electronic cameras to the personal computers, and provided at affordable prices. In such systems, it is difficult for the computers to take full-size images on real-time basis because of the limitation of transmission paths, such as a parallel interface (I/F) or a serial I/F, connecting the electronic cameras and the computers. Therefore, in the conventional systems, images are reduced in size in order to secure a speed for transmitting images on almost a real-time basis and inputted by the computers in a short interval, then the images are provided for a user to confirm an image. Then, after the user confirms a scene which is desired to obtain a reduced image, a shutter button of the electronic camera is pressed. Accordingly, it is possible to obtain a full-size still image after confirming it. Note, the reduced image used for confirmation is called "confirmation image", hereinafter.

The most difficult process in generating a panoramic image by synthesizing a plurality of images is to find overlapping portions, i.e., to find a group of corresponding pixels in the plurality of images (the process is called "corresponding point extraction", hereinafter). Where corresponding points are to be found in two images, for example, position relationship between these two images is detected, thus it is possible to synthesize the images.

Upon performing corresponding point extraction, characterizing points and/or resemblance points are needed in these images. In a case where there are little characterizing points and/or resemblance points in the images, an error may occur when performing the corresponding point extraction. As a result, intervention by the user is required in many cases, and it is difficult to realize a full-automatic corresponding point extraction process with the conventional technique.

SUMMARY OF THE INVENTION

The present invention has been made in consideration of the above situation, and has as its object to automatically determine timing for recording an image or images to be used for panoramic image synthesis.

It is another object of the present invention to provide an image synthesizing apparatus, an image sensing apparatus, and an image synthesizing system capable of automatically determining timing for recording an image or images to be used for panoramic image synthesis by reduced images generated from sensed images, without requiring an intervention of a user.

It is still another object of the present invention to provide an image synthesizing apparatus which receives reduced images, used for determining timing for recording an image or images, from an image sensing apparatus.

It is still another object of the present invention to provide an image synthesizing apparatus which generates reduced images, used for determining timing for recording an image or images, by reducing an image or images transmitted from an image sensing apparatus.

According to an aspect of the present invention, a user interface is improved by providing display means for displaying reduced images.

According to another aspect of the present invention, the position relationship between the first and second images to be synthesized is recognized by detecting the first overlapping portion between the first and second reduced images. This is for increasing processing speed for determining image recording timing.

According to another aspect of the present invention, the second overlapping portion between the first and second images is detected from the position relationship between the first and second reduced images, thereby increasing the processing speed for synthesizing the images.

According to another aspect of the present invention, determination means for determining whether the size of the first overlapping portion is appropriate or not is provided, thereby improving precision for determining image recording timing.

According to another aspect of the present invention, determination means for determining whether the size of the second overlapping portion is appropriate or not is provided, thereby improving the synthesis precision.

According to another aspect of the present invention, notification means for notifying a user of a determination result by the determination means is provided, thereby improving the user interface.

According to another aspect of the present invention, the second overlapping portion is roughly obtained by magnifying the first overlapping portion, edge pixels are extracted in the roughly obtained second overlapping portion as corresponding points, a mapping relationship between the first and second images is obtained on the basis of a group of extracted corresponding points, and the first and second images are combined by converting either the first or second image on the basis of the obtained mapping relationship.

According to another aspect of the present invention, position relationship between the first and second reduced images is detected by comparing pixel values of the first predetermined number of pixels which are set in the first reduced image to pixel values of the second predetermined number of pixels which are set in the second reduced image.

According to another aspect of the present invention, an amount an overlapping portion between the first and second reduced images is calculated on the basis of the position relationship between the first and second reduced images, and whether the ratio of the amount the overlapping portion to the area of the first or second reduced image is less than a first threshold or not is determined, and, when the ratio is less than the first threshold, this information is notified to the user as a timing suitable for recording an image to be used for image synthesis.

According to another aspect of the present invention, when the amount of the overlapping portion becomes less than a second threshold which is smaller than the first threshold, t is information is notified to the user in that it is not a timing suitable for recording an image to be used for image synthesis, thereby preventing inappropriate image recording operation.

According to another aspect of the present invention, the image sensing apparatus and the image synthesizing apparatus are connected with a general-purpose interface capable of transmitting images at high speed.

Other features and advantages of the present invention will be apparent from the following description taken in conjunction with the accompanying drawings, in which like reference characters designate the same or similar parts throughout the figures thereof. BRIEF DESCRIPTION OF THE DRAWINGS The accompanying drawings, which are incorporated in and constitute a part of the specification, illustrate embodiments of the invention and, together with the description, serve to explain the principles of the invention.

FIGS. 8B and 8C are explanatory views for explaining template matching method for recognizing an overlapping portion between confirmation images according to the embodiment;

FIG. 15 is a view showing the template image and a matching area in the corresponding point extraction processing;

DETAILED DESCRIPTION OF THE PREFERRED EMBODIMENTS

Figure 1:
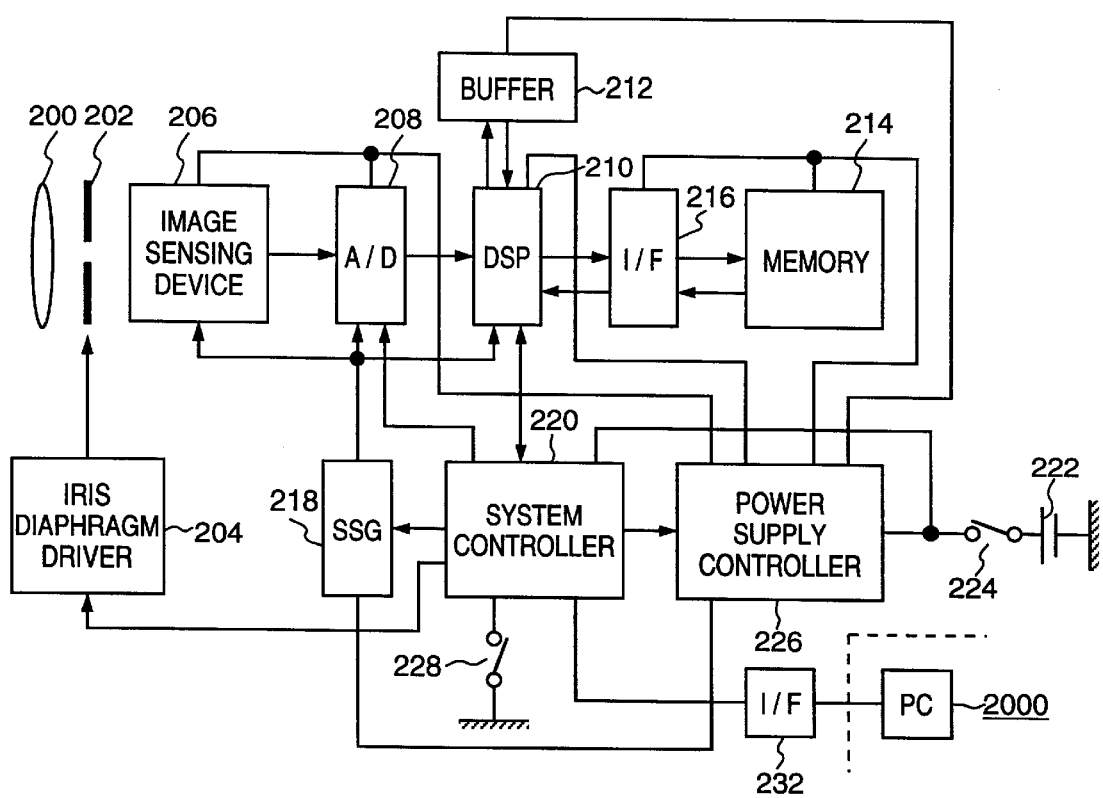
FIG. 1 is a block diagram illustrating a configuration of an electronic camera according to an embodiment of the present invention.

An image synthesizing system adopting the present invention will be described in accordance with the accompanying drawings.

The image synthesizing system requires image sensing means and image synthesizing means. These means do not have to be integrated, and may be arranged separately to configure the system as a whole. In the system according to the following embodiment, an electronic camera as the image sensing means and a personal computer system (so-called PC system) as the image synthesizing means are separately arranged, and they are connected via SCSI interface.

<Outline>

In the image synthesizing system, the electronic camera reduces an image which is currently sensed at real time and transmits it to the PC system, thereby the reduced image serves for checking an image to be recorded. Synthesis of images into a panoramic image is automatically performed by the PC system after taking images from the electronic camera.

First, the PC system requests a confirmation image to the electronic camera. In response, the electronic camera senses an object, reduces an obtained image to generate the confirmation image, then sends it to the PC system. The user presses a shutter button (icon) on a display screen of the PC system while watching the confirmation image. In response to this operation, the electronic camera sends the sensed image, i.e., an image which is an original image of the confirmation image that the user has just confirmed (first image =left image), to the PC system. Next, the user instructs the electronic camera to shift the image sensing point via the PC system in order to obtain a second image having an overlapping portion with the first image (i.e., the second image is to be synthesized with the first image). The PC system detects the direction and the amount of movement of the camera in accordance with the designation, and tracks the relative position of the second confirmation image with respect to the first confirmation image. While moving the image sensing point, the electronic camera keeps transmitting confirmation images to the PC system. Then, when the user presses the shutter button icon in the PC system, the electronic camera transmits the currently sensing image (second image) to the PC system. The PC system stores the relative position of the second image with respect to the first image at this point. When the user presses a "synthesis button" icon, the PC system starts panoramic image synthesizing processing. The PC system first finds overlapping portion between the first and second images on the basis of information on the stored relative position, then synthesizes the images.

Thus, in the image synthesizing system,

I: By displaying the relative position of the second image with respect to the first image by continuously displaying the reduced confirmation images until the "shutter button" icon, as a designation for recording the second image is pressed, information about how much and to which direction the camera has been moved is provided, further, a suggestion to how much and to which direction the camera is to be moved is given to the user.

II: Furthermore, the system has a function to notify a user of when the electronic camera has reached an image sensing point suitable for recording an image for panoramic image synthesis by a sound and/or by an image on the display. In addition, the system has a function to notify the user of when the overlapping portion between the first image and an image to be the second image is too narrow to synthesize the images and when the two images are not overlapping by a sound and/or an image on the display.

<Configuration of the Electronic Camera>

FIG. 1 is a block diagram illustrating an overall configuration of an electronic camera 1000 used in the image synthesizing system. To the electronic camera 1000, a PC system 2000 is connected via a SCSI interface 232.

It should be noted that, regarding the camera used in this image synthesizing system, if the image synthesizing device in the image synthesizing system is separately configured from the camera, an ordinary electronic camera may be used if the camera has capability to communicate with a computer.

In FIG. 1, reference numeral 200 denotes a lens unit; 202, an iris diaphragm; 204, an iris diaphragm driver for opening and closing the iris diaphragm 202; 206, an image sensing device; 208, an analog-digital (A/D) converter for converting an output from the image sensing device 206 to a digital signal; 210, a digital signal processor (DSP) which performs signal processes, such as photometry, colorimetry, and compression, by using a buffer memory 212.

Further, reference numeral 214 denotes a memory device having a large capacity for recording sensed images, and can be a magnetic disk drive, an optical disk drive, a magneto-optical drive, a solid-state memory device having EEPROM or DRAM whose battery is backed up, for example. As for the solid-state memory device, there is a so-called memory card. In this embodiment, a memory card is implemented as the memory device 214. Reference numeral 216 denotes an interface between the output terminal of the DSP 210 and the memory device 214.

Reference numeral 218 denotes a synchronizing signal generator (SSG) for providing clock and synchronizing signals used in the image sensing device 206, the A/D converter 208 and DSP 210; 220, a system controller for controlling the overall system; 222, a battery as a power source; 224, an on/off switch; 226, a power supply controller for controlling electric power supply to each of the circuits 204 to 218.

Reference numeral 228 denotes a shutter switch, which can be held in an intermediate position, which closes in accordance with press-down operation of a shutter release button. The system controller 220 executes image sensing operation (e.g., exposing the image sensing device 206 and reading signals) in response to the switch 228 being closed.

Reference numeral 232 denotes an external interface (I/F), such as a bidirectional parallel interface or SCSI interface, which is connected to a PC system 2000.

Figure 2:
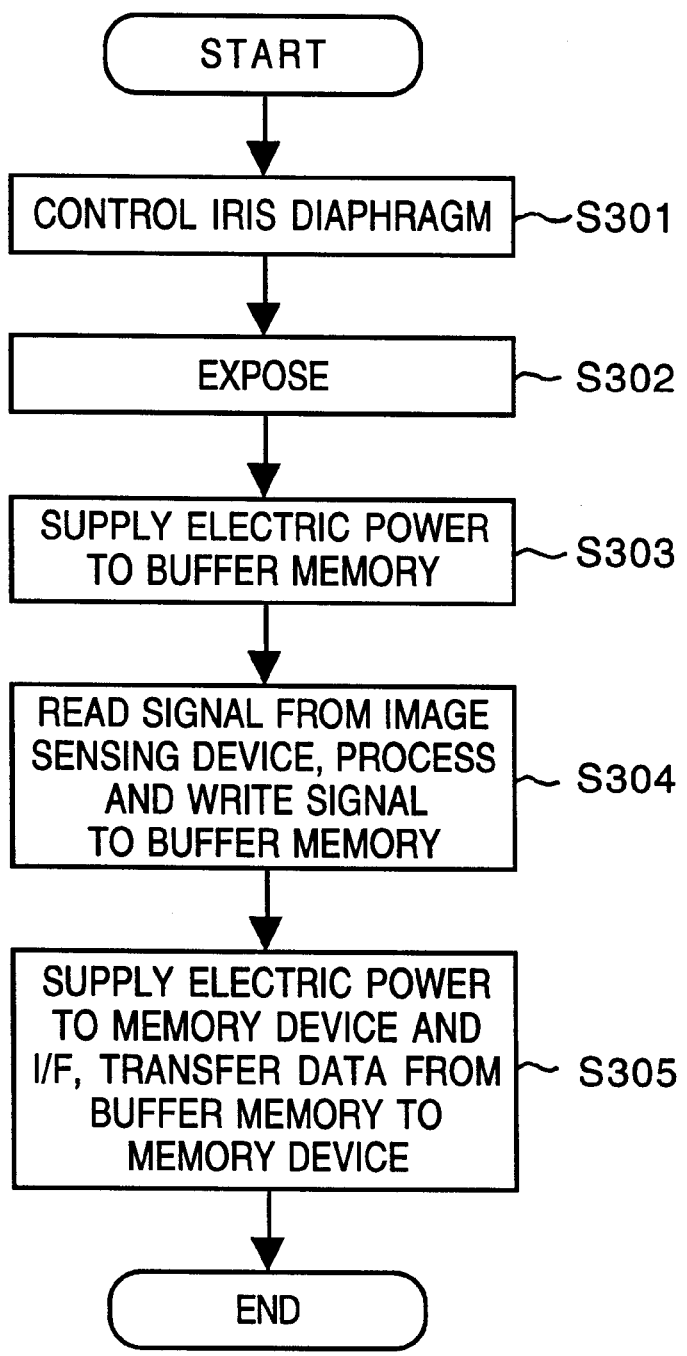
FIG. 2 is a flowchart showing an operation for sensing an image by the electronic camera shown in FIG.

FIG. 2 is a flowchart showing a sequence of control operation executed by the system controller 220 of the camera 1000 when sensing an image.

When the system controller 220 detects that the shutter switch 228 is closed, it controls the iris diaphragm 202 via the iris diaphragm driver 204 (step S301), thereby exposing the image sensing device 206 (step S302). Next, a buffer memory 212 is supplied with electric power (step S303). Then, an electric charge signal is read from the image sensing device 206 and converted into a digital signal by the A/D converter 208, then written to the buffer memory 212 via the DSP 210 (step S304). In this step, the system controller 220 controls the DSP 210 to perform a γ correction, a knee correction, a white balance adjustment, and further a compression in a predetermined compression method onto the signal data, and they write the processed digital data to the buffer memory 212. Next, the memory device 214 and the interface 216 are supplied with electric power, and the data stored in the buffer memory 212 is transferred to the memory device 214 via the DSP 210 and the interface 216 (step S305). Note, the data may be compressed before being transferred.

As described above, while the shutter switch 228 is held closed, the system controller 220 is able to transfer a sensed image (non-reduced image) as well as a reduced confirmation image to the PC system 2000 via the interface 232. The PC system 2000 sends a confirmation image request command when requesting the confirmation image and an image request command when requesting a non-reduced image to the camera 1000 via the interface 232.

<PC System>

Figure 3:
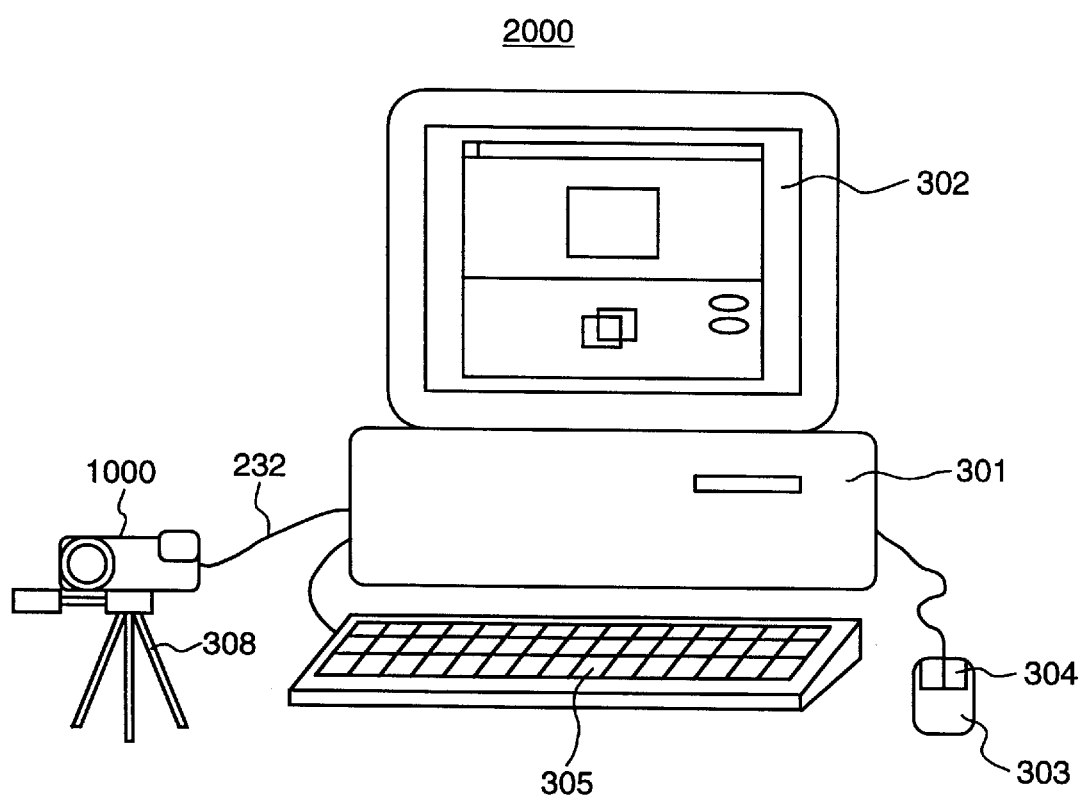
FIG. 3 is an overall view of an image synthesizing system according to the embodiment of the present invention.

FIG. 3 is an overall view of an image synthesizing system including the PC system 2000 which is a platform on which the present invention can be executed.

In FIG. 3, reference numeral 301 denotes a main body of the computer system; 302, a display for displaying data; 303, a mouse which is a typical pointing device; 304, a mouse button; and 305, a keyboard.

The above described electronic camera which is supported by a tripod 308 is connected to the PC system 2000 via a general-purpose interface 232, such as a bidirectional parallel interface or a SCSI interface, capable of transmitting an image at high speed.

Figure 4:
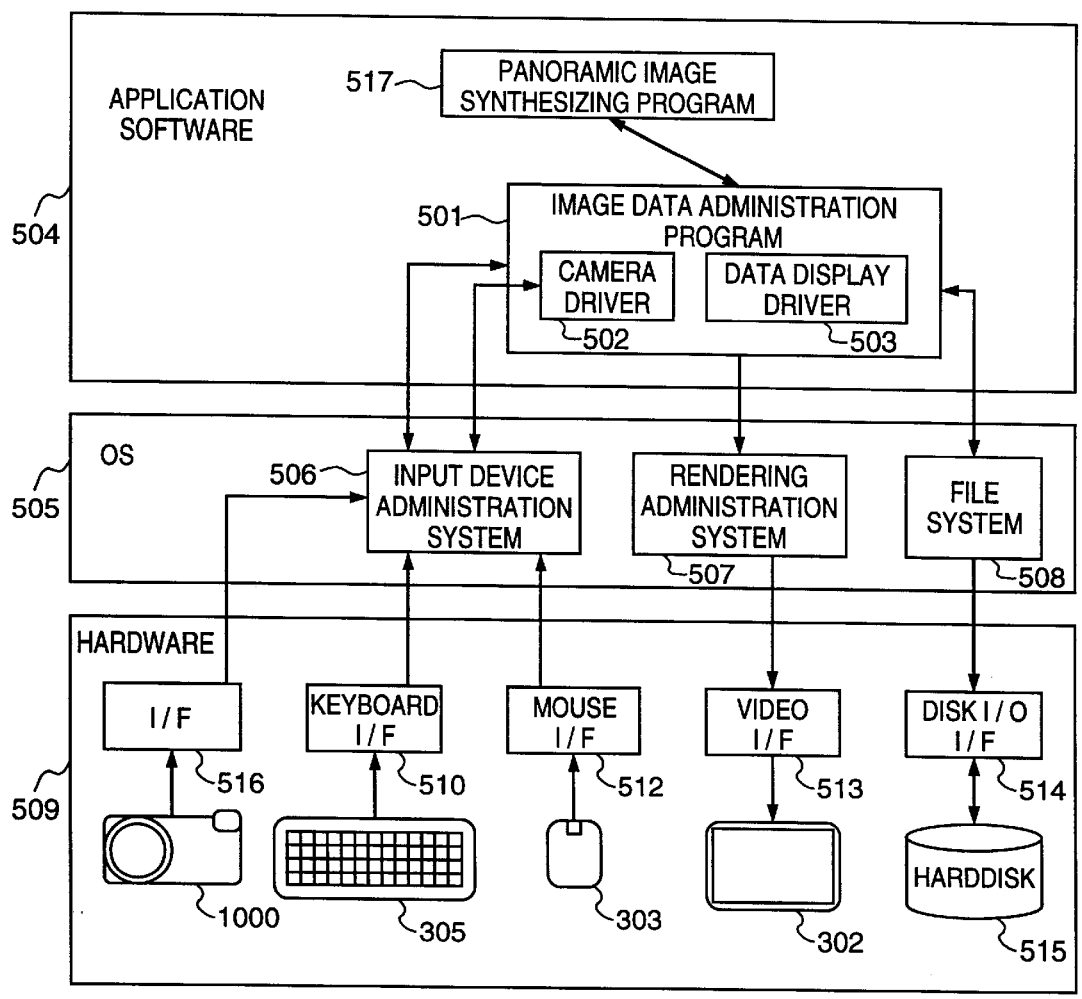
FIG. 4 is a view showing a configuration of the image synthesizing system including software and hardware according to the embodiment of the present invention.

FIG. 4 is a view showing a configuration of the panoramic image synthesizing system including software and hardware implemented by the PC system 2000.

In FIG. 4, reference numeral 509 denotes a hardware; 505, an operating system (OS) executed on the hardware 509; and 504, an application program executed on the OS 505. Note, in the blocks configuring the hardware 509 and the OS 505, blocks not necessary for explaining the embodiment of the present invention (e.g., CPU and memory in the hardware, and a memory administration system in the OS) are not shown in FIG. 4.

Reference numeral 515 denotes a hard disk for storing files and data; 508, a file system, configuring the OS, which has a function to make an application software be able to input and output a file without being conscious of the hardware; 514, a disk input/output (I/O) interface used so that the file system 508 reads and writes from/to the hard disk 515; and 507, a rendering administration system, configuring the OS, which has a function to make an application software be able to render without being conscious of the hardware.

Further, reference numeral 513 denotes a video interface for the rendering administration system 507 to render on the display 302; 506, an input device administration system, configuring the OS, which has a function to make an application software be able to receive an input by a user without being conscious of the hardware; 510, a keyboard interface for the input device administration system 506 to receive an input from the keyboard 305; and 512, a mouse interface for the input device administration system 506 to receive an input from the mouse 303.

Reference numeral 516 denotes an interface, such as a bidirectional interface or SCSI interface, which is connected to the electronic camera 1000 for exchanging image data, and the like, via the input device administration system 506; and 501, an image data administration program.

Further, reference numeral 502 denotes a program to request a confirmation image to the camera 1000 and control the receipt of a sensed image, i.e., a camera driver program; and 503, a data display driver program for generating a confirmation image (i.e., data-manipulation operation for reducing sensed images), displaying the confirmation image, and displaying image data which is already taken and under administration.

It should be noted that a digital signal processor (DSP) of the camera 1000 has a function for reducing an image. In this embodiment, reduction of an image for obtaining a confirmation image is performed by the DSP of the camera 1000. The camera driver 502 may have a role to reduce an image.

Reference numeral 517 denotes a panoramic image synthesizing program which receives sensed images from the image data administration program 501, performs panoramic image synthesizing processing, and register a resultant synthesized image to the image data administration program 501. The detail of the panoramic image synthesizing program will be described with reference to FIG. 6.

<User Interface>

Figure 5:
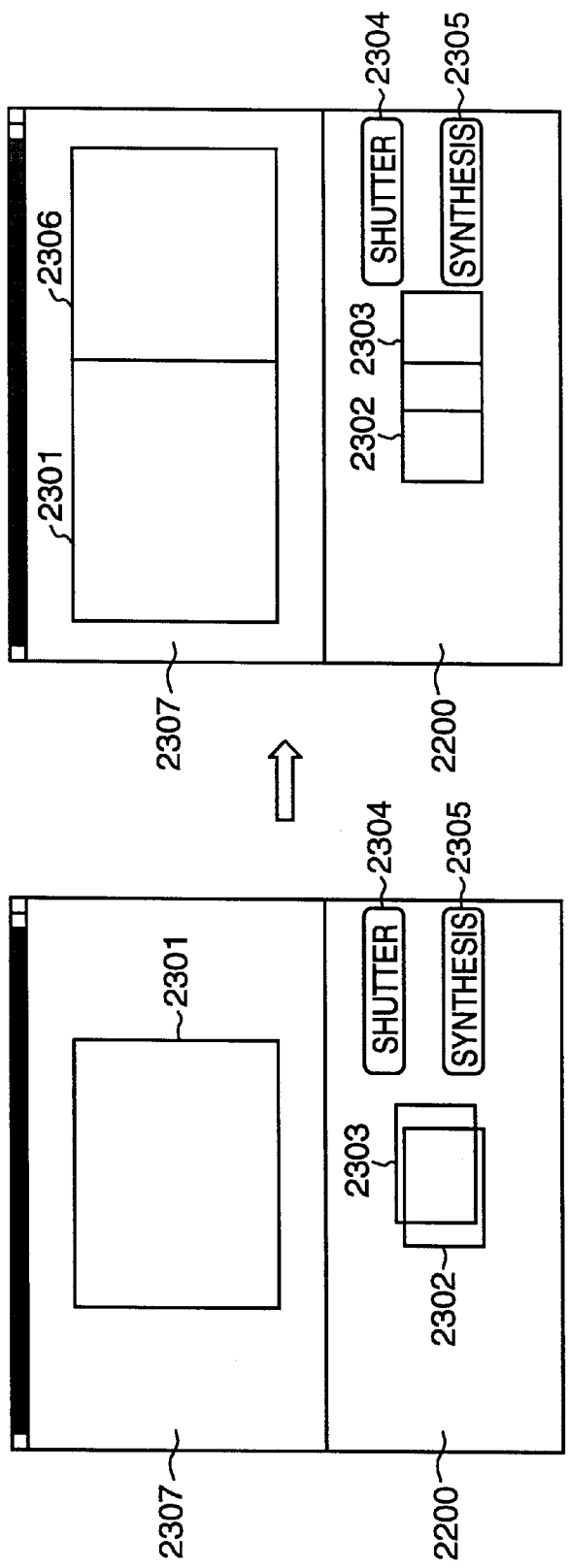
FIGS. 5A and 5B are views showing transition of displayed image as a user interface according to the embodiment.

FIGS. 5A and 5B show graphic user interface implemented by the PC system 2000. More specifically, FIGS. 5A and 5B show transition of an image displayed in user interface windows 2200 and 2307 which are displayed on the display 302.

In FIGS. 5A and 5B, reference numeral 2301 denotes a base image (referred by "first image", hereinafter) with which another image is synthesized, and reference numeral 2306 denotes an image which is combined to the first image 2301 (referred by "second image", hereinafter). Further, reference numeral 2302 is an image to confirm the first image 2301 (referred by "first confirmation image", hereinafter), and 2303 is an image to confirm the second image 2306 (referred by "second confirmation image", hereinafter). The first confirmation image 2302 and the second confirmation image 2303 are generated from the first image 2301 and the second image 2306, respectively.

As described above, the user interface of the image synthesizing system has the window 2307 for displaying the contents of the sensed images (the first and second images) and the window 2200 for displaying the confirmation images to show the relative position between the sensed images.

Note, in the following explanation, when synthesizing images, by using the left and right images, the first image is occasionally referred to as "left image" and the second image is occasionally referred to as "right image" for convenience.

Referring to FIGS. 5A and 5B, an operation sequence of the user interface for image synthesis is briefly explained.

First, the user presses a shutter button icon 2304 on the display of the computer while watching the first confirmation image 2302 displayed in the window 2200. In response to this operation, the first image 2301 is "recorded" (image data is registered in the file system 508 in practice). The "recorded" first image 2301 is displayed in the area, as shown in FIG. 5A, in the window 2307. Next, the user shifts the image sensing point of the electronic camera 1000 by moving the tripod 308 for obtaining the second image 2306 which overlap the first image 2301. While shifting the image sensing point, the direction and the amount of shift of the second confirmation image 2303 which moves as the image sensing point shifts are calculated by executing the panoramic image synthesizing program 517, thereby tracking the relative position of the second image 2306 with respect to the first image 2301. Meanwhile, the second confirmation image 2303 is displayed in the window 2200 at a relative position with respect to the displayed position of the first confirmation image 2302. In this manner, the user is informed how much and to which direction the camera has to be moved. Then, when the user presses the shutter button icon 2304, the second image 2306 is "recorded" (i.e., the second image is registered in the file system 508). The "recorded" image 2306 is displayed in the window 2307 as shown in FIG. 5B.

Next, in response to a press-down operation of a synthesis button icon 2305 by the user, the panoramic image synthesizing processing starts. More specifically, the relative position between the first image 2301 and the second image 2307 is obtained on the basis of the information on the relative position and the images are synthesized by executing the panoramic image synthesizing program 517. Then, the resultant synthesized panoramic image is displayed in the window 2307.

Note, there is provided with a function for recognizing that the electronic camera 1000 detects an image sensing point suitable for recording an image to be synthesized into a panoramic image while moving the camera 1000 (the state shown in FIG. 5B) and notifying the user of that by sound or by using other method, e.g., displaying frame lines of the confirmation images 2302 and 2303 brightly. As for the detail of this function, refer to step S2803 in FIG. 10.

<Overall Control Sequence>

Figure 6:
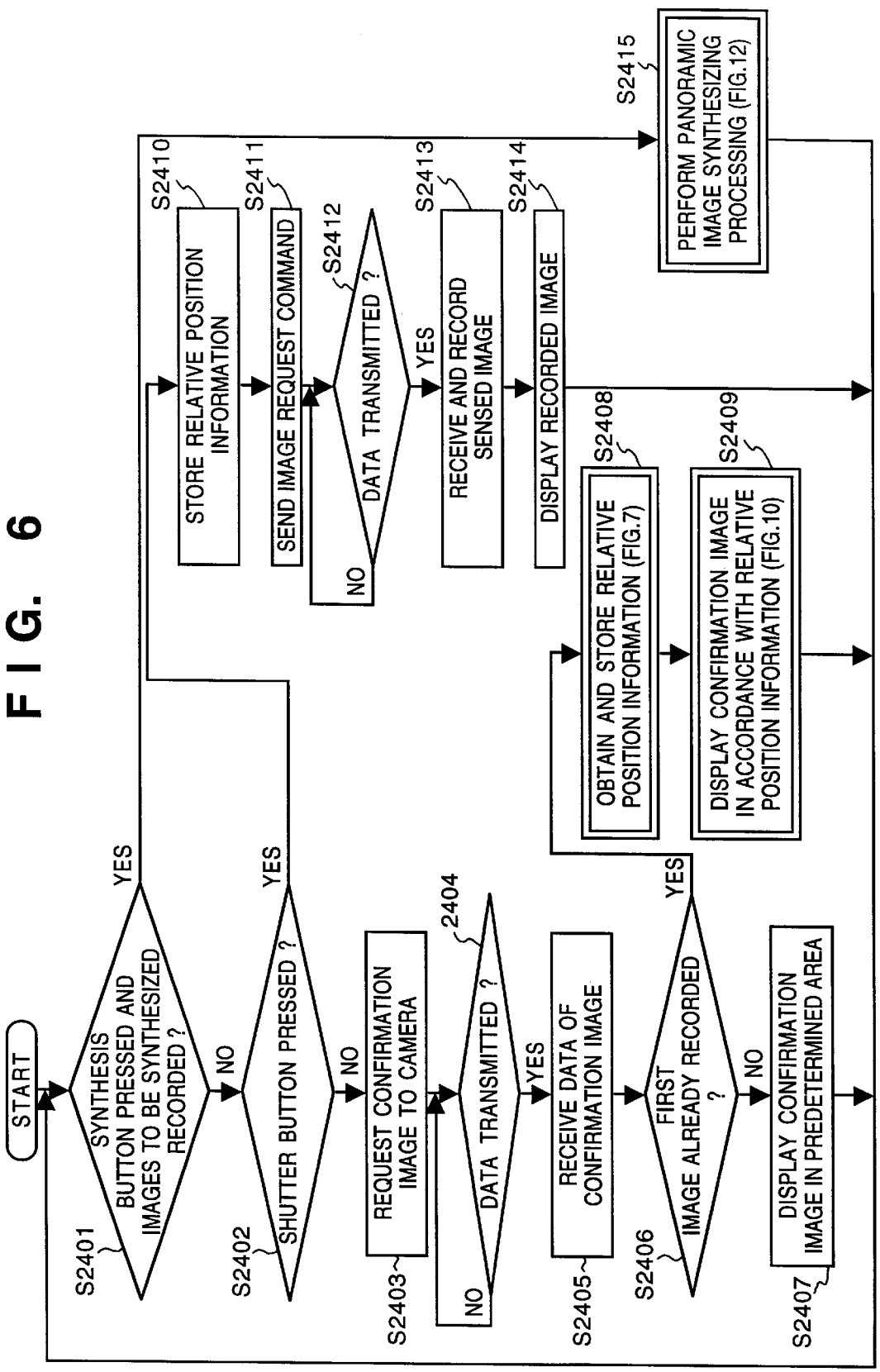
FIG. 6 is a flowchart showing a flow of overall control of the image synthesizing system.

A flowchart in FIG. 6 is for explaining an overall sequence of the panoramic image synthesizing program 517.

At step S2401, whether or not the synthesis button (icon) 2305 is pressed is checked. When the icon 2305 is pressed, then it is confirmed that a plurality of images to be synthesized have already been recorded, then the panoramic image synthesizing processing is performed at step S2415. The synthesis button (icon) 2305 will be pressed by the user when more than two images to be synthesized have been recorded.

Whereas, when the synthesis button (icon) 2305 is not pressed or when a plurality of images to be synthesized have not been recorded even if the synthesis button (icon) 2305 is pressed, then whether the shutter button 2304 is pressed or not is checked at step S2402. If No at step S2304, then a sequence for taking the confirmation image starts at step S2403.

At step S2403, a confirmation image request command is sent to the electronic camera 1000 via the camera driver 502, the input device administration system 506, and the SCSI interface 516. In response to this command, the camera 1000 will send image data of the confirmation image to the PC system 2000. The process waits until the image data is transmitted at step S2404. When the image data is transmitted, then it is received at step S2405.

At step S2406, whether there is a first image which is already recorded or not is checked. If the first image has not been sensed yet, the checked result is NO. In a case where the first image is to be recorded, since the step S2406 is NO, the confirmation image is displayed in a predetermined area (the area 2302 in FIG. 5A) in the window 2200 at step S2407, then the process returns to step S2401. At this point, the first image has not been recorded, and will be recorded when the shutter button is pressed.

The above control is for displaying a sensed scene as a confirmation image on the electronic camera 1000 when the shutter button is not pressed.

When the shutter button is pressed (YES at step S2402), then the control advances from step S2402 to step S2410. At steps S2410 to S2414, an image sensed when the shutter button is pressed is recorded as the first image, then displayed in the window 2307.

At step S2410, information on the relative position (relative position information) of a second image with respect to a first image is stored. Since this is a case where the first image has not been sensed, the relative position information is invalid, i.e., (0, 0). Next at step S2411, an image request command (original: a request command to take a sensed image) is outputted to the electronic camera 1000 by the camera driver 502. The process waits until data of the sensed image is transmitted at step S2412, and at step S2413, the data of the sensed image is received and registered (i.e., recorded) as a file. Thereafter, at step S2414, the data of the recorded image is displayed in the window 2307.

After the first image is recorded, the user will move the electronic camera 1000. Unless the shutter button is pressed while the camera 1000 is being moved, the control advances from step S2406 to step S2408. At step S2408, the relative position of the second image with respect to the first image is obtained, then information on the obtained result (relative position information) is stored. The details of step S2408 will be explained with reference to FIG. 7. Then, images are displayed as 2302 and 2303 in FIG. 5A in accordance with the relative position information, and whether the current image sensing point of the camera is appropriate to record the second image to be synthesized into a panoramic image or not is checked at step S2409. A sequence for determining whether an image sensing point is appropriate to record the second image or not will be explained later with reference to FIG. 10.

When it is confirmed that the shutter button 2304 is pressed for recording the second image at step S2402, then the control advances to step S2410. At steps S2410 to S2414, an image sensed when the shutter button is pressed is recorded as the second image, then displayed in the window 2307.

When the user presses the synthesis button 2305 after the second image is recorded (Yes at step S2401), then the panoramic image synthesizing processing is performed at step S2415. The details of the panoramic image synthesizing processing will be explained with reference to the flowchart shown in FIG. 12. The resultant synthesized image is displayed in the window 2307.

Note, the above explanation is based on a case where two images are to be synthesized, however, in a case of synthesizing a greater number of images, only by increasing the number of times to repeat steps of displaying confirmation images (step S2408 and S2409) and steps for recording sensed images (steps S2410 to 2414), the images are synthesized in substantially the same sequence as described above.

Next, steps S2408, S2409 and S2414 in the sequence shown in FIG. 6 will be explained in detail.

<Detection of Relative Position>

Figure 7:
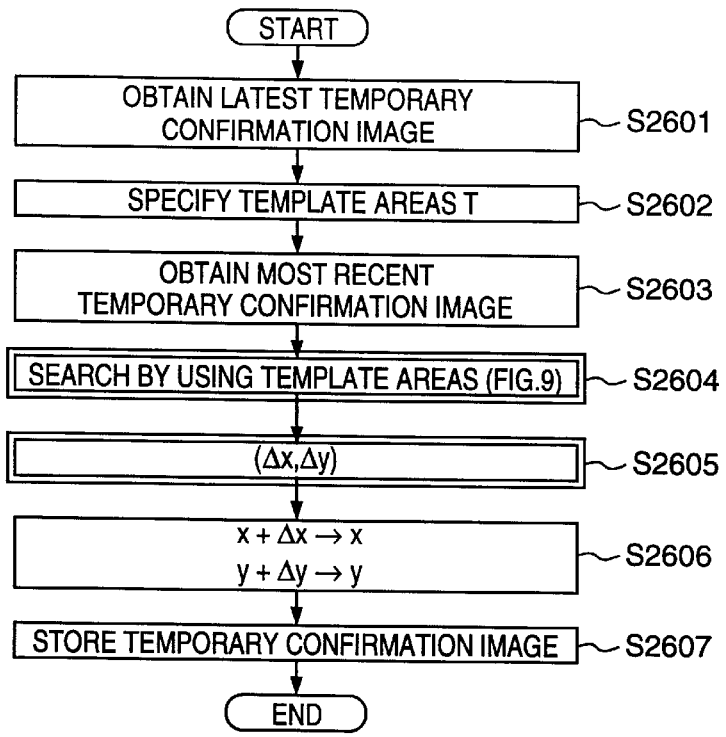
FIG. 7 is a flowchart showing a processing sequence for tracking a relative position between images in response to the movement of a camera.

FIG. 7 is a flowchart showing a control sequence of the process, performed at step S2408, for obtaining the relative position of the second image with respect to the first image.

Figure 8A:
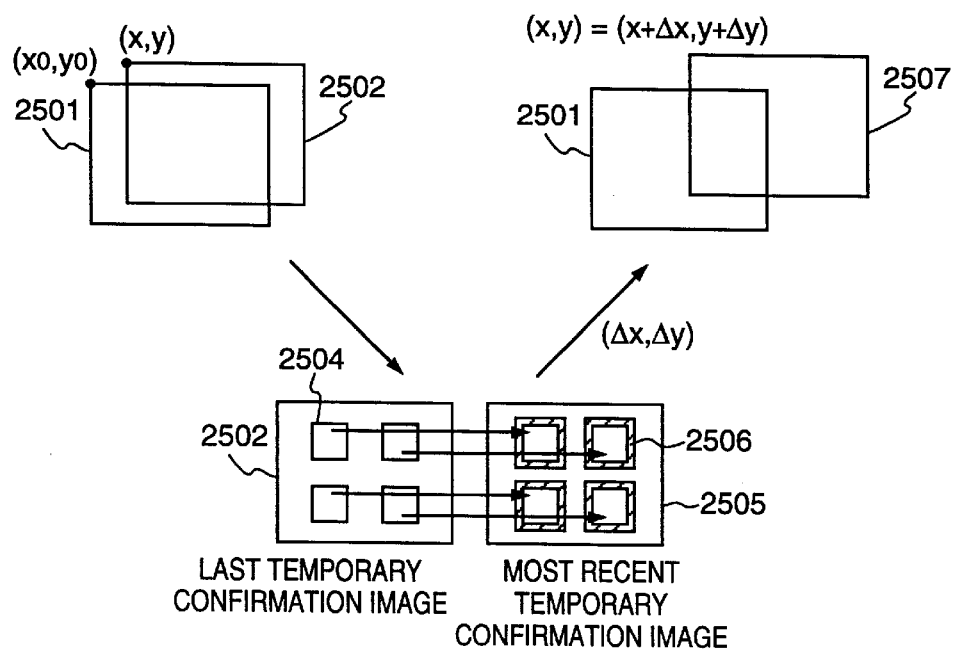
FIG. 8A is an explanatory view for explaining the processing for tracking the relative position between images in response to the movement of the camera.
Figure 8C:
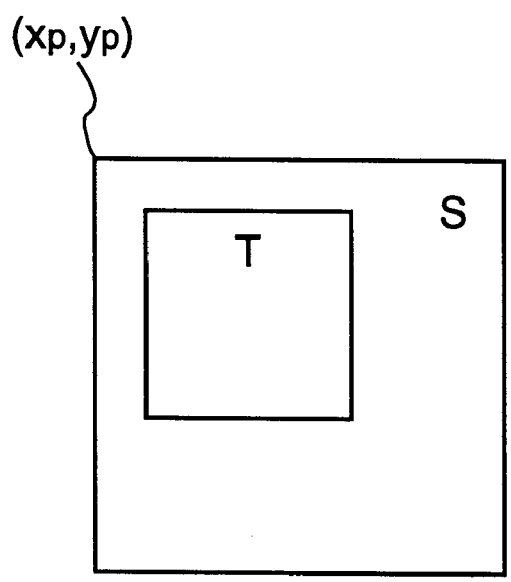

The control sequence of FIG. 7 will be easily understood by referring to FIGS. 8A to 8C.

In FIG. 8A, reference numeral 2501 denotes a confirmation image (first confirmation image) of an image which has been already sensed (i.e., whose image data is registered in the file system 508). More specifically, the first confirmation image 2501 is a confirmation image sensed when the shutter button has been pressed. Reference numeral 2502 denotes a confirmation image of an image sensed most recently (since the confirmation image is for temporary use, it is called "temporary confirmation image", hereinafter), and the shutter button has not been pressed for the second time with respect to the temporary confirmation image 2502.

Let the coordinate of a pixel at the left-uppermost corner of the first confirmation image 2501 be $(x_0, y_0)$. Further, let the coordinate of a pixel at the left-uppermost corner of the temporary confirmation image 2502 be $(x, y)$ (the coordinate of the pixel is referred as "relative position", hereinafter), and it is assumed that this relative position is already known.

It is assumed that the user moves the camera 1000 by $\Delta x$ in the X direction and by $\Delta y$ in the Y direction, and a confirmation image 2505 is obtained at this moment.

In this embodiment, since the camera 1000 is manually moved, the amounts of movement, $\Delta x$ and $\Delta y$, are not known. In this embodiment, the amounts of movement, $\Delta x$ and $\Delta y$, are calculated by using template matching method. The precision of matching operation by using only one template is low, therefore, a plurality of templates located in accordance with predetermined position relationship are used in this embodiment. More specifically, four reference template areas T (2504) located at predetermined positions, as shown in FIGS. 8A and 8B, are of interest in the temporary confirmation image 2502. The centers of the four reference templates T coincide with vertexes of a rectangle of $L_x \times L_y$, as shown in FIG. 8B. The reference template areas T are used for template matching. In the temporary confirmation image 2505 at this point, four search areas 2506 are specified as shown in FIG. 8B. The center of each of four search areas S coincides with each vertex of a rectangle of $L_x \times L_y$. The size of each search area S is set larger than that of each reference template area T. Each reference template area T(i) is moved within the corresponding search area S(i) to find an area where the template area T(i) matches best in the corresponding search area S.

The matching of the template area T and the search area S is performed in the following manner, for example. First, the difference value D between the value of a pixel in the template area T(i) and the value of a corresponding pixel in the corresponding search area S(i) is calculated for all the pixels of the template area T(i). The sum of the difference values D, i.e., $\Sigma D$, yields the minimum value, $\Sigma D_{min}$, when an area which consists of the pixels used for the above calculation in the corresponding search area is determined as the "best matching area" with respect to the template area T(i).

It is preferred to check the reliability of the aforesaid determination. For this purpose, the four minimum totals of differences are calculated by each template area T(i), and if any of the minimum total ($\Sigma D_{min}$) for a specific template area T is larger than a predetermined threshold $\delta_{th}$ (i.e., $\Sigma D_{min} > \delta_{th}$), then it is considered that the above matching determination for the specific template area T is not reliable. Therefore, the determination for the specific template area T is ignored, and amounts of movement ($\Delta x$, $\Delta y$) will be obtained from the rest of the information on the position.

Then, by adding ($\Delta x$, $\Delta y$) to the former relative position (x, y), a new relative position is obtained. Namely, the relative position is updated as follow.

$$x \leftarrow x+\Delta x$$
$$y \leftarrow y+\Delta y \qquad (1)$$

Next, the operation shown in FIGS. 8A and 8B will be explained once more in accordance with the flowchart shown in FIG. 7.

At step S2601, the latest temporary confirmation image (the image 2502 in the example shown in FIGS. 8A and 8B) is obtained from a memory. At step S2602, a plurality of template areas (e.g., four areas as shown in FIG. 8B) are specified in the temporary confirmation image 2502. By assigning independent variables, i, to these four areas, they are denoted as T(i) (where i=1 to 4). Next at step S2603, the most recent temporary confirmation image (the image 2505 in FIG. 8A) is obtained from the memory, and four search areas S are set in the temporary confirmation image 2505. Each of the four areas S is referred in accordance with the independent variables, i, and each search area is written as S(i) (where i=1 to 4). At step S2604, an area where each template area T(i) matches best in the corresponding search area S(i) is searched. At step S2605, the amounts of movement ($\Delta x$, $\Delta y$) is calculated from the matched position and the position where the template area T(i) is specified. The detailed flowchart of steps S2604 and S2605 are shown in FIG. 9.

Figure 9:
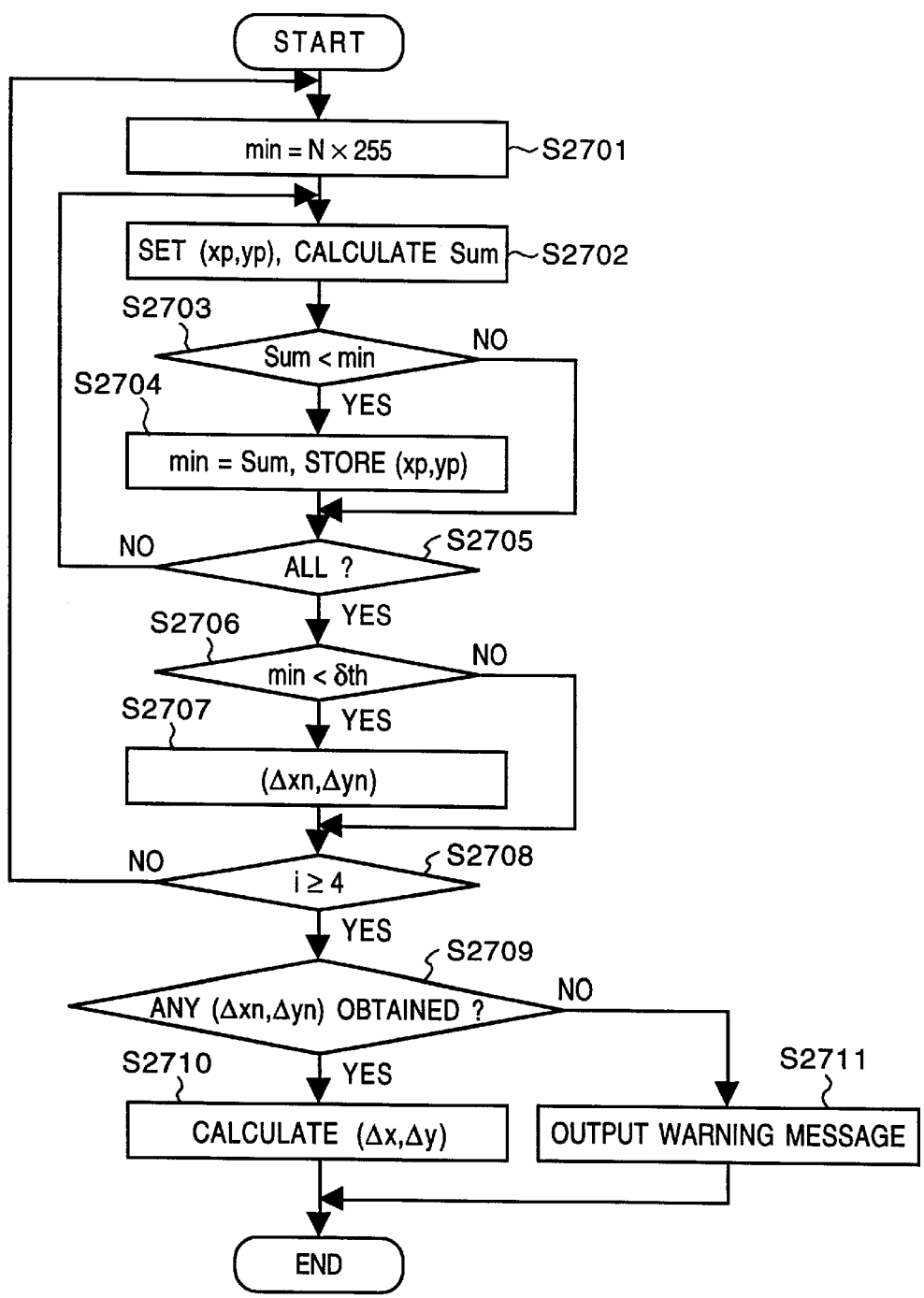
FIG. 9 is a flowchart showing a control sequence for calculating a relative position.

At step S2701 in FIG. 9, a variable, min, is initialized. In this case, min is initialized to a value obtained by multiplying the number of pixels in a reference template by the maximum value 255. In the example shown in FIG. 8A, the four template areas are specified and those template areas are set equal. Let the number of the pixels in each area be N, then the initial value of the variable n is, $$\text{min}=N \times 255 \qquad (2)$$

At step S2702, an absolute value $D_k$ of a difference between the a pair, k, of a pixel $P_{Tk}(i)$ in the template area T(i), and a corresponding pixel $P_{Sk}(i)$ in the search area S(i) which corresponds to the template area T(i), namely, $$D_k = |P_{Sk}(i) - P_{Tk}(i)|$$

is calculated. Here, the set of pixels $P_{Sk}$ compose an area which is equal in size to the template area T and whose left-uppermost corner is an arbitrary point ($x_p$, $y_p$) in the search area S and corresponds to the left-uppermost corner (x(i), y(i)) of the template area T (the set of pixels $P_{Sk}$ is called "area ($x_p$, $y_p$)" for convenience) as shown in FIG. 8C. Namely, the set of pixels $P_{Sk}$ correspond to all the pixels in the area ($x_p$, $y_p$). At step S2702, the total of the absolute values of the differences, $\Sigma_k D_k$, is calculated, then a variable, Sum, is substituted by the obtained value. The summation is performed for all the pairs k in the area ($x_p$, $y_p$).

$$\text{Sum} = \Sigma_k D_k \qquad (3)$$

If $$\text{Sum} < \text{min} \qquad (4)$$

at step S2703, then it is assumed that the template area T and the area ($x_p$, $y_p$) in the search area S match, therefore $$\text{min} = \text{Sum} \qquad (5)$$

is set at step S2704 while storing position information, ($x_p$, $y_p$).

The above processes (steps S2702 to S2704) are repeated until the area ($x_p$, $y_p$) covers the entire search area S by changing the location of the area ($x_p$, $y_p$). If YES at step S2705, it means that, in a combination of the given template area T(i) and search area S(i), when the left-uppermost corner (x(i), y(i)) of the template area T(i) is at the position ($x_p$, $y_p$) in the search area S(i), the template area T(i) matches best the search area S(i) (the position ($x_p$, $y_p$) is referred by "matching position"). The degree of matching (in other words, degree of difference) is stored as the variable, min.

At step S2706, whether the value, min, is equal or less then the threshold ($\delta_{th}$) or not, i.e., whether the matching position ($x_p$, $y_p$) obtained at step S2704 is reliable or not is checked. The matching position ($x_p$, $y_p$) here is the position when $$\text{Sum} < \text{min} \qquad (6)$$

is determined at the latest timing in the loop of steps S2702 to S2705. If $$\text{min} < \delta_{th} \qquad (7)$$

at step S2706, then the matching position ($x_p$, $y_p$) obtained at step S2704 is determined reliable.

If it is determined that the obtained matching position is reliable, the amounts of movement ($\Delta x_n$, $\Delta y_n$) are calculated from the difference between the position of the left-uppermost corner (x(i), y(i)) of the template area T(i) and the matching position ($x_p$, $y_p$).

$$\Delta x_n = x_p - x(i)$$
$$\Delta y_n = y_p - y(i) \qquad (8)$$

The aforesaid processes at steps S2701 to S2707 are repeated for all the reference template areas (i=1 to 4, $1 \leq n \leq 4$ in this case).

When processes at steps S2701 to S2707 are completed for every reference template area, four sets of calculated results on the amounts of movement ($\Delta x_n$, $\Delta y_n$) are to be obtained.

If no calculation result of the amount of movement ($\Delta x_n$, $\Delta y_n$) is obtained, the process is interrupted at step S2711. As for a reason for this result, it is considered that the speed for panning the electronic camera 1000 is faster than the processing speed of the image synthesizing system. Therefore, it is necessary to move (pan) the camera at a speed to which the processing speed of the image synthesizing system can response (namely, at a lower speed). When there is a failure to obtain an amount of movement ($\Delta x_n$, $\Delta y_n$) then a warning message indicating that the panning speed is too fast is outputted, then the process is interrupted.

Whereas, if it is determined at step S2709 that there is at least one set of effective amounts of movement ($\Delta x_n$, $\Delta y_n$), then the averages of the effective amounts ($\Delta x_n$, $\Delta y_n$) are calculated at step S2710. This average is defined as the amounts of movement of the most recent temporary confirmation image 2505 with reference to the last temporary confirmation image 2502.

$$\Delta x = (\Delta x_n)_{avg}$$
$$\Delta y = (\Delta y_n)_{avg} \qquad (9)$$

Thus, the amounts of movement ($\Delta x$, $\Delta y$) are obtained in the processes at steps S2604 and S2605 in FIG. 7.

Referring to FIG. 7, the obtained ($\Delta x$, $\Delta y$) is added to the relative position (x, y) of the last temporary confirmation image 2502 at step S2606 and the added result is used as the new relative position (x, y).

$$x = x + \Delta x$$
$$y = y + \Delta y \quad (10)$$

Then at step S2607, since the last temporary confirmation image 2502 is not necessary any more, it is deleted from the memory, and the most recent temporary confirmation image 2505 is stored in the memory.

Thereby, the tracking processing of the confirmation image is completed.

The confirmation image is preferably an image of small size, such as 160×120 pixels, for example. This is because the confirmation image is for confirming framing of an image by the camera. Basically, the confirmation image has to be confirmed by a user as soon as possible, ideally at real time, thus it is preferable that the camera sends an image to the image synthesizing apparatus at real time. However, it is difficult for the camera to transmit a confirmation image of full-size and for a personal computer to receive and display it because of processing load on the camera, the limitation of transfer rate of an interface connecting between the camera and the personal computer, and the limitation of a display speed in the personal computer. As a result, when speed for displaying a confirmation image is given priority over the size of the confirmation image, the size of the image becomes small. Furthermore, since the aforesaid processes for calculating the amounts of movement of the confirmation image have to be performed at high speed, a small size image is preferred. This is because the size of the reference template area can be reduced, thus searching with the template is performed only in the small area.

The above is the explanation of a sequence for determining the relative position. Briefly, first, the first confirmation image for the first image as well as the position information of the first confirmation image are obtained and then the first confirmation image is displayed in the window 2200 at step S2407 shown in FIG. 6. Thereafter, the second confirmation image for the second image as well as the position information of the second confirmation image are obtained at step S2408, then the second confirmation image is displayed in the window 2200 at step S2409.

<Automatic Determination of Timing for Recording Used in Image Synthesis>

The image synthesizing apparatus of this embodiment has a function for determining, in place of the user, whether an image at a position of the current second confirmation image is suitable to be synthesized with the first image, which is already obtained, into a panoramic image.

Figure 10:
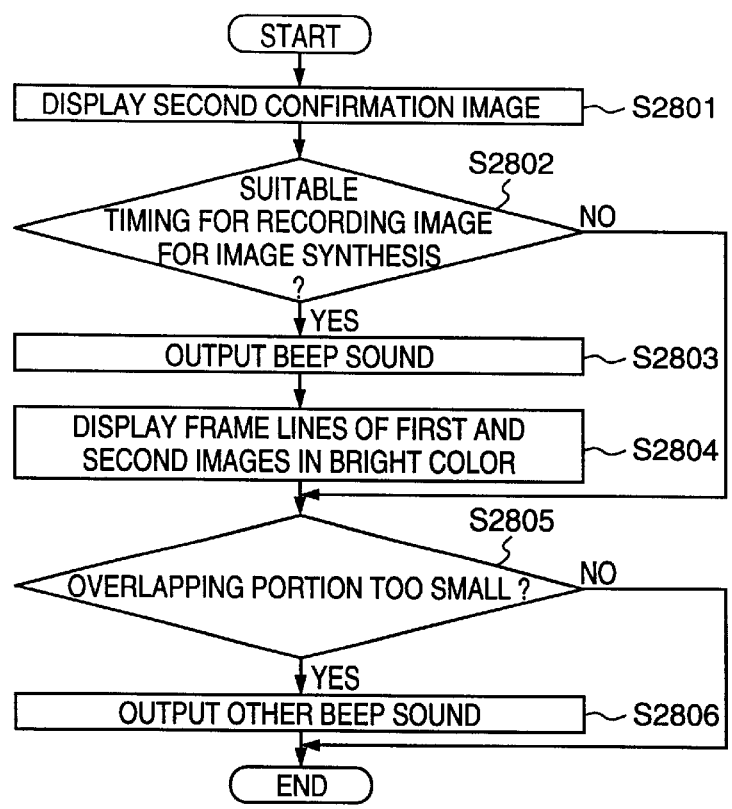
FIG. 10 is a flowchart showing a processing for checking whether an image sensing point is appropriate for recording the second image or not.

A flowchart showing a processing sequence for determining whether the current image sensing point is appropriate for recording the second image to be synthesized into a panoramic image is shown in FIG. 10. Step S2409 in FIG. 6 includes the processing sequence shown in FIG. 10 as its part.

When the processing sequence shown in FIG. 10 is executed, the first image has been already displayed in the window 2307 at step S2414 (FIG. 6) and the second confirmation image is about to be displayed at step S2409 (FIG. 6). More specifically, the second confirmation image is displayed at a position $(x_0 + \Delta x, y_0 + \Delta y)$ in the window 2200 at step S2801 in FIG. 10. Therefore, the second confirmation image is displayed at a position shifted from the first confirmation image by $\Delta x$ in the X direction and $\Delta y$ in the Y direction. At step S2802, whether the entire image corresponding to the current second confirmation image at the position $(x_0 + \Delta x, y_0 + \Delta y)$ is suitable to be synthesized with the first image into a single panoramic image is checked. The conditions for the current second confirmation image to be "appropriate" are:

(1): Necessary amount of overlapping portion for extracting corresponding points is secured; and
(2): An image which is as wide as possible can be obtained (i.e., the amount of overlapping portion is small).

More specifically, if the panoramic synthesis is performed based on two images adjoining in the right-left direction, when the width of an overlapping portion is within 15%±5% of the width of the first or second confirmation image and when the height of the overlapping portion is more than 80% of the height of the first or second confirmation image, it is determined that it is the suitable timing for recording an image to be used for panoramic synthesis. Further, if the panoramic synthesis is performed based on two image adjoining in the vertical direction, when the height of an overlapping portion is within 15%±5% of the height of the first or second confirmation image and when the width of the overlapping portion is more than 80% of the width of the first or second confirmation image, it is determined that it is the suitable timing for recording an image to be use for panoramic synthesis.

Figure 11:
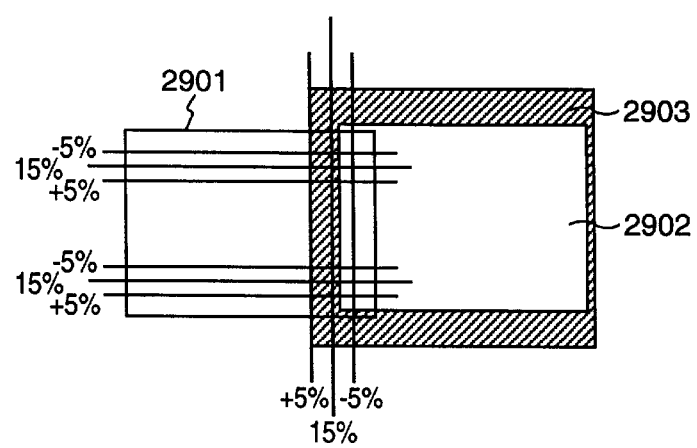
FIG. 11 is an explanatory view for explaining an appropriate position.

An example of panoramic synthesis using images adjoining in the right-left direction is shown in FIG. 11. In FIG. 11, reference numeral 2901 denotes the first confirmation image, and reference numeral 2902 denotes the second confirmation image. In this example, the width of the overlapping portion is within 15%±5% of the width of the second confirmation image 2902. In FIG. 11, the area 2903 shows an allowance where the second confirmation image 2902 can be moved while keeping the overlapping portion of the first and confirmation images to have width of 15%±5% and height of more than 80% of the width and height of the first or second confirmation image, respectively. More specifically, to determine whether the two confirmation images satisfy the above two conditions or not is equivalent to determining whether or not the second confirmation image 2902 is within the area 2903.

If it is determined at step S2802 that the entire image corresponding to the second confirmation image 2902 is appropriate (suitable) for panoramic image synthesis with the first image, then a beep sound is outputted at step S2803. Thereafter, the frame lines of the first and second confirmation images are displayed in a bright color. Other sound and displaying methods can be used instead of the above sound and the displaying method.

Next, it is determined at step S2805 that the confirmation images are not in position relationship in which the panoramic image synthesis can be performed with these images. The position relationship between the images in which the panoramic image synthesis can not be performed is that the amount of overlapping portion is too small to perform adequate corresponding point extraction which will be explained later. More specifically, in a case where either the width or height of the overlapping portion becomes less than 10% of the width or height of the confirmation image (includes a case where the two confirmation images are completely separated, of course), it is determined that the panoramic image synthesis can not be performed with the images. In such case, some notification, e.g., outputting a warning sound, is provided to the user. The user knows that the amount the overlapping portion is too small from the sound or the notification, and moves the camera to the direction which increases the area of overlapping portion as a result.

The processing for checking whether or not the camera is at an appropriate position for sensing an image used for panoramic image synthesis is completed. The user moves the camera toward an appropriate position while watching the second confirmation image, and presses the shutter button 2304 shown in FIG. 5 (YES at step S2402), thereby the second image is recorded (step S2413). Thereafter, in response to the press-down operation of the synthesis button 2305, the generation of a panoramic image starts.

<Brief Sequence of Panoramic Image Synthesis>

Next, a detailed sequence of the panoramic image synthesis processing performed at step S2415 (FIG. 6) will be explained.

Figure 12:
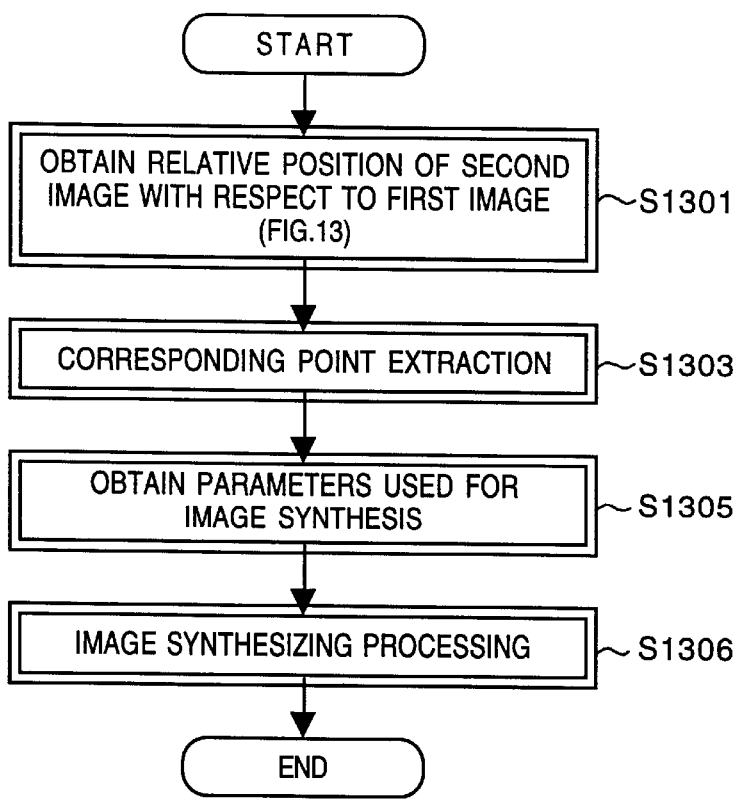
FIG. 12 is a flowchart showing an overall sequence of panoramic image synthesizing processing.

FIG. 12 is a flowchart briefly showing a sequence of the panoramic image synthesizing processing.

First at step S1301, the relative position of the second image with respect to the first image, calculated at steps S2408 and S2410, is obtained. Since this relative position is calculated in accordance with the method described with reference to FIGS. 8A to 8C, it may contain an error. Therefore, if the panoramic image synthesis is performed based on this relative position, an error may occur. The corresponding point extraction (will be explained later in detail) performed at step S1303 is aimed to detect a more accurate relative position.

Next at step S1305, synthesis parameters are set. In order to synthesize images into a panoramic image, it is necessary to know what relationship the two images have, or, how the one image has to be moved, expanded (reduced), and/or rotated, to match the other image. Here, since the replacement, expansion (reduction), and rotation are generally expressed by affine transformation, to find parameters for the affine transformation is a key to the panoramic image synthesis. The parameters for the affine transformation are obtained from a set of coordinates of corresponding points obtained at step S1303.

Next at step S1306, the images are synthesized on the basis of the parameter.

Next, each of steps S1301, S1303, S1305 and S1306 in FIG. 12 is explained in detail.

<Detection of Relative Position between the Two Images>

Figure 13:
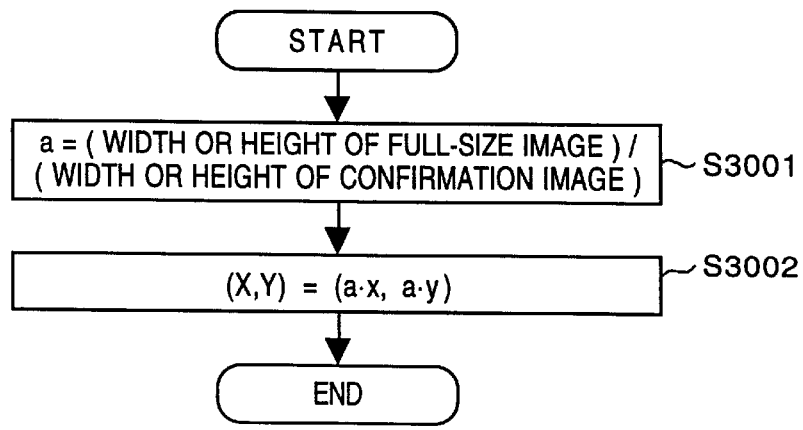
FIG. 13 is a flowchart showing coordinate transformation of the relative position.

The flowchart shown in FIG. 13 shows the detail of a processing sequence for obtaining a relative position of the second image with respect to the first image at step S1301 in FIG. 12.

Confirmation image is a reduced image, therefore, confirmation images have to be transformed into the coordinate system of a full-size image (non-reduced image). Accordingly, at step S3001, a magnification ratio, a, is obtained in accordance with the following equation, $$a = \text{(width or height of full-size image)/(width or height of confirmation image)} \quad (11)$$

Then at step S3002, a relative position (X, Y) of a full-size image corresponding to the second confirmation image is obtained by multiplying the relative point of the second confirmation image (x, y) by the magnification ratio, a.

$$(X, Y) = (a \cdot x, a \cdot y) \quad (12)$$

The relative position (X, Y) includes an error caused because the relative position (x, y) in the coordinate system of the confirmation images are magnified. Further, the second image may be tilted with respect to the first image, but the relative position (x, y) does not include the amount of tilt. Therefore, the aforesaid relative position (X, Y) shows an approximate relative position, thus, a more accurate relative position is obtained in the corresponding point extraction performed at step S1303.

<Accurate Extraction of Corresponding Points>

Figure 14A:
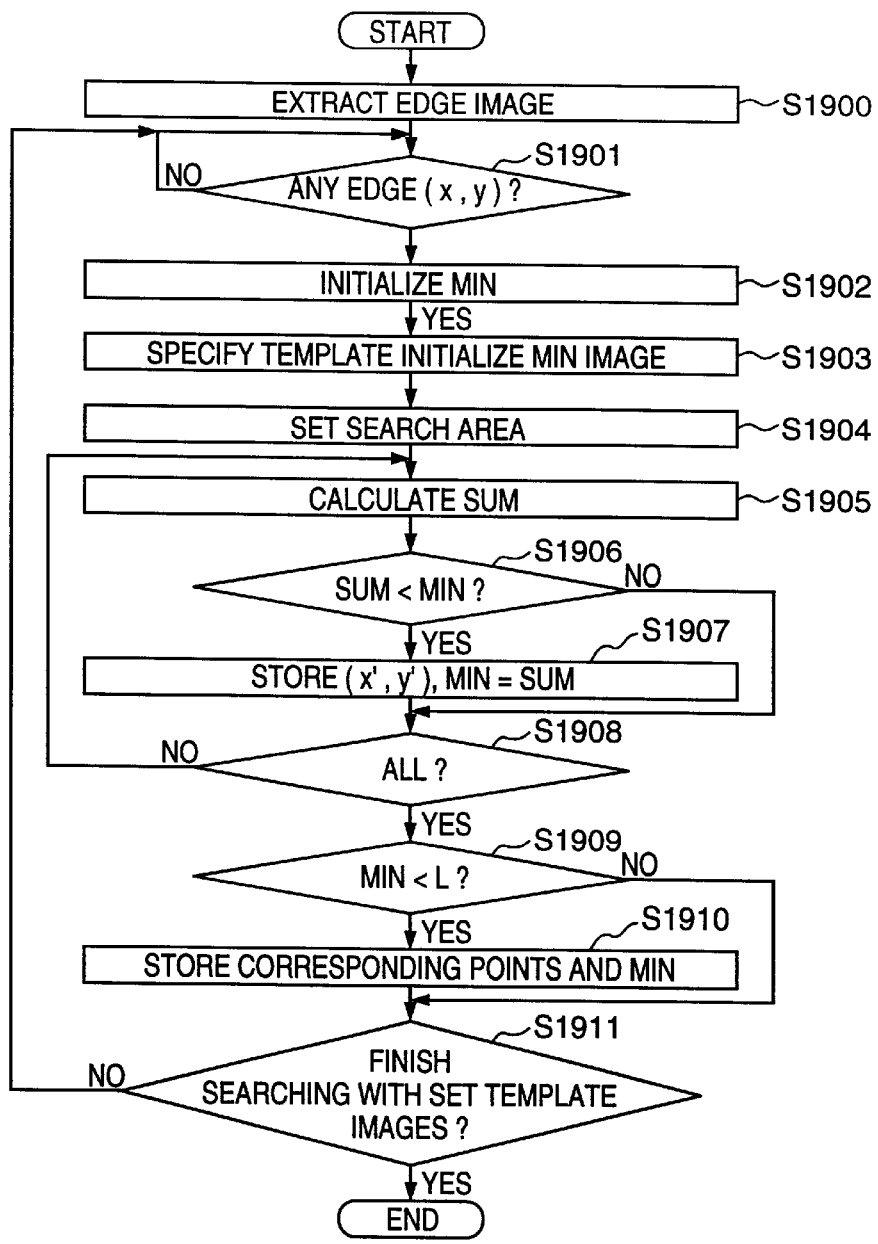
FIG. 14A is a flowchart showing corresponding point extraction processing.

FIG. 14A shows a flowchart showing a detailed sequence of the corresponding point extraction, and FIG. 15 is an explanatory view showing the operation. Note, in FIG. 15, an example of synthesizing left and right two images is shown. A left image 2001 corresponds to a first image, and a right image 2002 corresponds to a second image. When the number of images to be synthesized is more than 2, the same processing for synthesizing two images is to be repeated necessary number of times. Therefore, the basic processing is the same.

Upon performing corresponding point extraction at step S1303 in FIG. 14A, the method of template matching explained with reference to FIG. 8A is used. The method is explained with reference to FIG. 15.

Referring to FIG. 15, the left image 2001 is at a position $(ax_0, ay_0)$, and the right image 2002 is at the position (X, Y) calculated in accordance with the equation (12). Reference numerals 2005 and 2006 denote overlapping areas in the left image 2001 and the right image 2002, respectively. It is not necessary to search all the corresponding points in the both areas. The pixels which have large values as a factor indicating edge property are easy to search as corresponding points, therefore, a pixel whose factor showing edge property has a greater value than a predetermined value is searched in the area 2005, then a square of n×n pixels whose center is the searched pixel is used as a template area T. This is defined as a template image 2003.

In the corresponding area 2006 in the right image 2002, there is a portion which corresponds to the template image T (2003). An area which is expanded from the corresponding portion by a predetermined length in all the directions is defined as a search area S (2004). Then, the template image T (2003) is placed at an arbitrary position (x, y) in the search area S (2004), then the difference of the template image 2003 and the search area 2004 at that position is obtained by pixel. Then, the coordinate position (x', y') of the template image (2003) in the search area S (2004) when the sum of the differences is minimum is obtained. If the resultant minimum value obtained after searching the entire area of the search area S (2003) is less than a predetermined threshold, L, then the positions (x, y) and (x', y') are stored as a pair of corresponding points.

The above corresponding point extraction will be further explained in detail with reference to the flowchart in FIG. 14A.

First, at step S1900, an edge image is extracted from the overlapping portion 2005. Known edge extraction is performed by using, for example, a Laplacian filter.

Figure 14B:
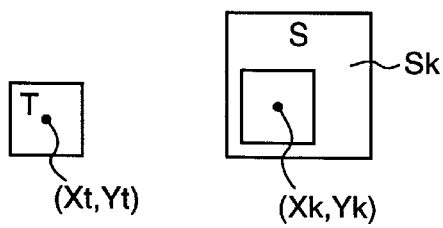
FIG. 14B is an explanatory view for explaining template matching processing for detecting a corresponding point between recorded images.

At step S1901, a point (x, y) whose factor showing edge property having a greater value than a predetermined value is searched in the area 2005. If there is a point which has a large value as the factor indicating edge property, then a variable MIN is initialized at step S1903. This variable MIN is used for the same purpose as the aforesaid variable min (refer to step S2701). A square of n×n pixels whose center is at the obtained point is specified, and it is considered as the template T. The template image T is referred by the center position (coordinate) $(x_t, y_t)$ as shown in FIG. 14B. Next at step S1904, the search area S which corresponds to the coordinate position $(x_t, y_t)$ is set in the overlapping portion 2006. Since the areas 2005 and 2006 have one-to-one correspondence, it is possible to uniquely determine the area S. Then at step S1905, an arbitrary area $S_k$ having the same area as that of the template T is set in the search area S. This area $S_k$ is referred by the coordinate of the center position $(x_k, y_k)$. The template image T and the area $S_k$ are compared, and an absolute value of the difference between each pair of pixels in the template image T and the area $S_k$ is obtained, then the sum of the absolute values is calculated.

$$SUM = \Sigma_p |P_{sp} - P_{tp}| \tag{13}$$

Where p indicates an arbitrary pixel position in the area $S_k$, and $\Sigma$ is for summing the absolute values for all p. Next at step S1906, the value SUM and the variable MIN are compared. If $$SUM < MIN \tag{14}$$

then, the template image T at the coordinate $(x_t, y_t)$ is more likely to match the search area $S_k$ at the coordinate $(x_k, y_k)$. Thus, the value SUM obtained at this point is stored as the variable MIN at step S1907. In addition, the coordinate position $(x_k, y_k)$ of the area $S_k$ at that time is stored. In other words, the variable MIN stores the degree of difference between the template image T and the search area $S_k$.

At step S1908, whether search of the corresponding points is performed for all the positions in the search area S or not is determined. At this point, the variable MIN stores the degree of difference between the edge image at the position $(x_t, y_t)$ (i.e., template image T) in the area 2005 and the edge image which is considered to match best the edge image $S_k$ in the area 2006 (located at $(x_k, y_k)$). The larger the degree of the difference is, the less appropriate it is to consider the points as corresponding points. Therefore, whether or not the degree of difference is less than the threshold L is determined at step S1909. Namely, if $$MIN < L \tag{15}$$

then, the search area $S_k$ should be determined that it corresponds the detected template image T. Therefore, $(x_t, y_t), (x_k, y_k)$ and the variable MIN are stored in a list of corresponding points in correspondence with each other. The aforesaid processes are performed on all the set template images at step S1911 to complete the corresponding point extraction processing.

<Affine Transformation>

Next, processing for setting synthesis parameters (synthesis parameter setting processing) at step S1305 in FIG. 12 is explained.

Generally, a relative position of an image with respect to another image can be expressed with the parallel displacement in the x and y directions, rotation, and an expansion at a ratio. Therefore, a corresponding point (x', y') which is obtained from a point (x, y) by rotating by an angle $\theta$ with respect to Z axis, displacing by $\Delta x$ in the x direction and $\Delta y$ in the Y direction and multiplying by m, can be expressed as below.

$$\begin{pmatrix} x' \\ y' \end{pmatrix} = \left\{ \begin{pmatrix} \cos\theta & \sin\theta \\ -\sin\theta & \cos\theta \end{pmatrix} \begin{pmatrix} x \\ y \end{pmatrix} - \begin{pmatrix} \Delta x \\ \Delta y \end{pmatrix} \right\} \cdot m \tag{16}$$

$$= \begin{pmatrix} m(\cos\theta \cdot x + \sin\theta \cdot y - \Delta y) \\ m(-\sin\theta \cdot x + \cos\theta \cdot y - \Delta y) \end{pmatrix}$$

$$= \begin{pmatrix} Ax + By + C \\ -Bx + Ay + D \end{pmatrix}$$

The parameters A, B, C and D, when determined, define this coordinate transformation (affine transformation).

In the aforesaid corresponding point extraction processing, a plurality of pairs of corresponding points, $(x_t, y_t)$ and $(x_k, y_k)$, are obtained. For expressing the corresponding points, $(x_t, y_t)$ and $(x_k, y_k)$, easily, they are written as, $(x_i,$ $y_i)$ and $(x_i', y_i')$ (i=1, 2, ... ). In consideration that a set of pairs of corresponding points distribute in a predetermined pattern (quadratic function), the parameters A, B, C and D are determined as ones that minimize the following evaluation function $\epsilon$. More specifically, if the evaluation function $\epsilon$ is defined as:

$$\varepsilon = \sum_i \begin{bmatrix} \{(A \cdot x_i + B \cdot y_i + C) - x_i'\}^2 \\ + \{(-B \cdot x_i + A \cdot y_i + D) - y_i'\}^2 \end{bmatrix} \tag{17}$$

then, the parameters A, B, C and D which minimize $\epsilon$ are equivalent to parameters A, B, C and D satisfying the following equations:

$$\frac{\partial \varepsilon}{\partial A} = (\sum x_i^2 + \sum y_i^2)A + \tag{18}$$
$$(\sum x_i)C + (\sum y_i)D + (-\sum x_i x_i' - \sum y_i y_i') = 0$$

$$\frac{\partial \varepsilon}{\partial B} = (\sum x_i^2 + \sum y_i^2)B +$$
$$(\sum y_i)C + (\sum x_i)D + (-\sum x_i' y_i - \sum x_i y_i') = 0$$

$$\frac{\partial \varepsilon}{\partial C} = (\sum x_i)A + (\sum y_i)B + nC - (\sum y_i') = 0$$

$$\frac{\partial \varepsilon}{\partial D} = (\sum y_i)A - (\sum x_i)B + nD - (\sum y_i') = 0$$

Note, if $$P_1 = \Sigma x_i^2 + \Sigma y_i^2$$

$$P_2 = \Sigma x_i$$

$$P_3 = \Sigma y_i$$

$$P_4 = \Sigma x_i x_i' + \Sigma y_i y_i'$$

$$P_5 = \Sigma x_i y_i' + \Sigma x_i' y_i$$

$$P_6 = \Sigma x_i'$$

$$P_7 = \Sigma y_i'$$

$$P_8 = n \text{ (the number of corresponding points)} \tag{19}$$

then, the parameters A, B, C and D are expressed as follow:

$$A = (P_2 P_6 + P_3 P_7 - P_4 P_8)/(P_2^2 + P_3^2 - P_1 P_8)$$

$$B = (P_3 P_6 - P_2 P_7 + P_5 P_8)/(P_2^2 + P_3^2 - P_1 P_8)$$

$$C = (P_6 - P_2 A - P_3 B)/P_8$$

$$D = (P_7 - P_3 A + P_2 B)/P_8 \tag{20}$$

More specifically, an arbitrary point $(x_i, y_i)$ in the left image (first image) corresponds to the corresponding point $(x_i', y_i')$ of the right image (second image), therefore, the point $(x_i', y_i')$ is obtained by applying the affine transformation determined by the parameters A, B, C and D to the point $(x_i, y_i)$.

An operation of the image synthesizing processing at step S1306 in FIG. 12 is explained with reference to FIGS. 16 and 17.

Figure 16:
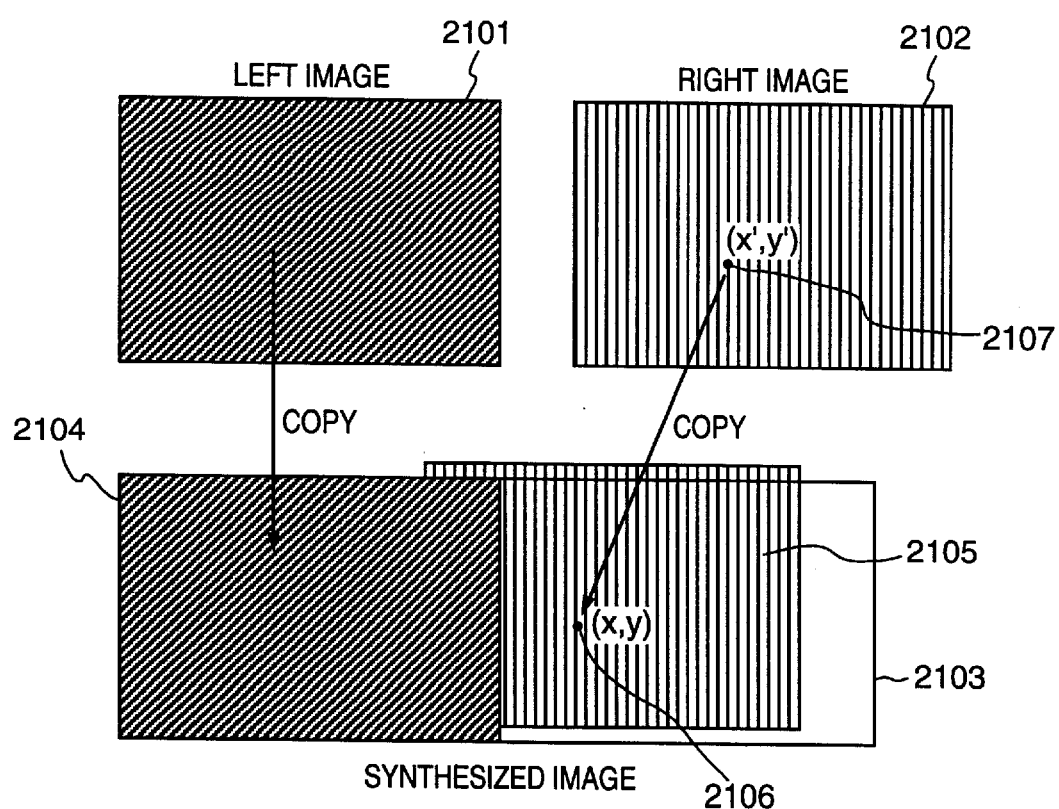
FIG. 16 is a view showing a synthesizing process.

In FIG. 16, reference numeral 2101 denotes a left image (first image) and 2101 denotes a right image (second image).

Figure 17:
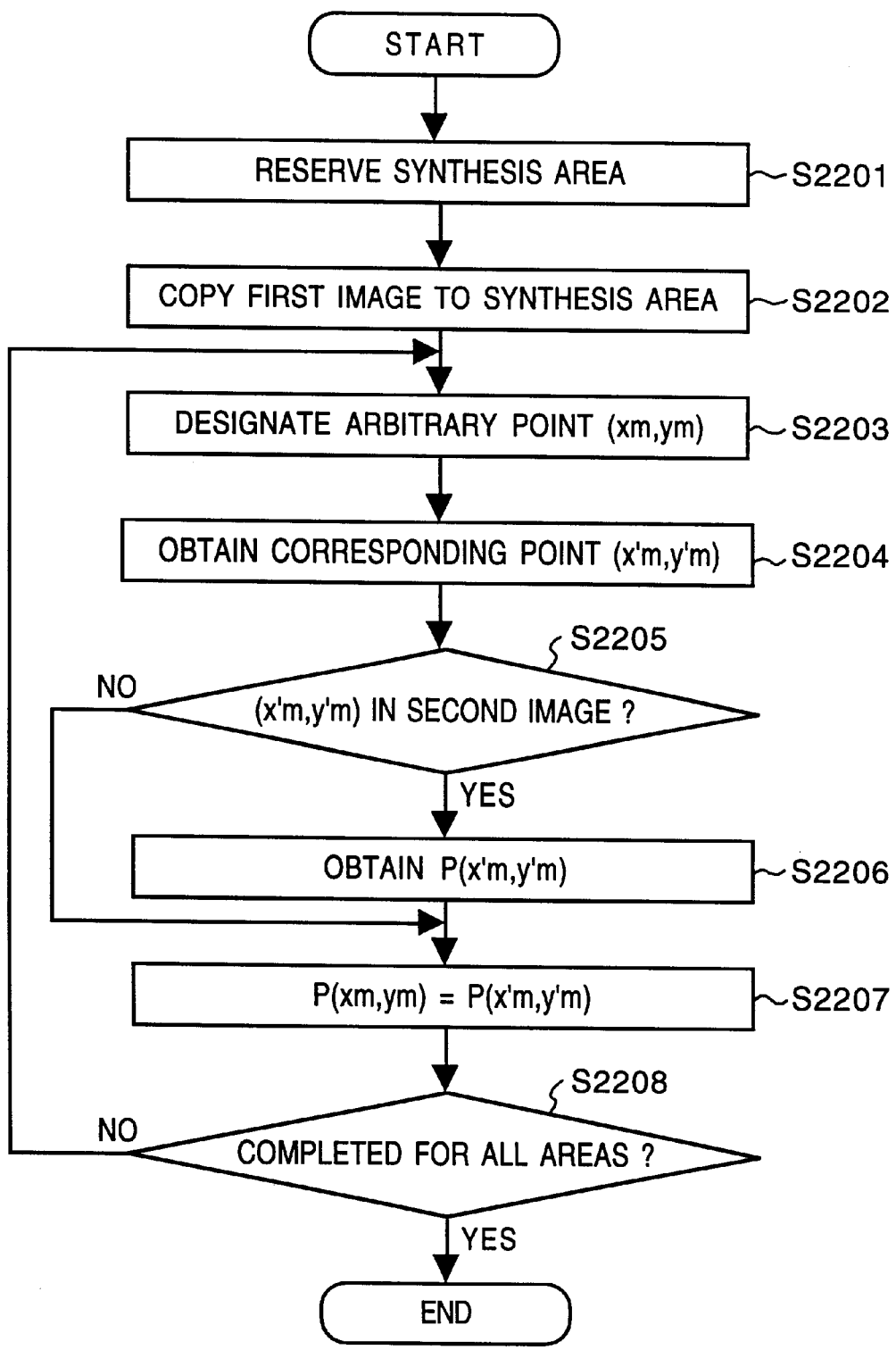
FIG. 17 is a flowchart showing the synthesizing process.

First, an area 2103 which is twice larger than the left image 2101 is reserved as a work area for synthesizing images (step S2201 in FIG. 17). The left image 2101 is directly copied to the area 2104 in the area 2103 (step S2202 in FIG. 17).

Steps S2203 to S2205 in FIG. 17 show a sequence for copying the right image in the synthesis area 2103.

At step S2203, an arbitrary point ($x_m$, $y_m$) in the rest of the synthesis area 2103 is designated. At step S2204, this point ($x_m$, $y_m$) is transformed into the space of the right image (second image) by the affine transformation to obtain a point ($x'_m$, $y'_m$), in the coordinate space of the right image, corresponding to the point ($x_m$, $y_m$). At step S2205, whether the corresponding point ($x'_m$, $y'_m$) is in the right image (second image) or not is checked. At step S2206, a pixel value $P(x'_m, y'_m)$ of the corresponding point ($x'_m$, $y'_m$) is obtained. At step S2207, the pixel value $P(x'_m, y'_m)$ is copied to the point ($x_m$, $y_m$) as a pixel value of a synthesized image.

Accordingly, a synthesized panoramic image is finally generated.

<Modifications>

The present invention can be modified in various ways.

For example, the displacement of the camera 1000 can be performed via the user interface provided on the PC system 2000.

Further, the present invention can be applied to panoramic synthesis of more than two images.

Furthermore, the present invention can be applied to panoramic synthesis of images which adjoin to each other not only in the right-left direction but also in the vertical direction.

In the above embodiments, the confirmation image is generated by the camera 1000. The processing for reducing an image for obtaining a confirmation image is not a heavy load. Therefore, it is possible to make the PC system 2000 reduce an image. In such case, the PC system 2000 does not have to transmit the confirmation image request command, therefore, the protocol between the camera 1000 and the PC system 2000 is simplified.

The present invention is not limited to the above embodiments and various changes and modifications can be made within the spirit and scope of the present invention. Therefore to appraise the public of the scope of the present invention, the following claims are made.

What is claimed is:

1. An image sensing apparatus comprising:

image pick-up means for sensing an object and obtaining image signals;

signal processing means for outputting image signals representing first and second picked-up images of the object sensed at different image view positions in response to a request signal from an image synthesizing device, and confirmation image signals obtained by reducing the first and second picked-up images, to the image synthesizing device;

determination means for automatically determining an overlapping state of the confirmation image signals; and displaying means for simultaneously displaying, on a monitor screen, the confirmation image signals corresponding to the first and second images in such a manner that the overlapping state of the first and second images is expressed and an image generated by synthesizing the first and second picked-up images, wherein the second picked-up image is updated at a predetermined interval.

2. An image synthesizing apparatus comprising:

reception means for receiving an image signal representing a picked-up image from an image pick-up device and receiving a confirmation image signal representing a reduced image of the picked-up image;

determination means for automatically determining relative positions between first and second confirmation images received by said reception means;

synthesizing means for synthesizing first and second images received corresponding to the first and second confirmation images, respectively, on the basis of the relative positions determined by said determination means; and displaying means for simultaneously displaying the first and second confirmation images and a synthesized image of the first and second images in such a manner that the relative positions of the first and second confirmation images are expressed and a synthesized image of the first and second images, wherein the second confirmation image is updated at a predetermined interval.

3. The image synthesizing apparatus according to claim 2, wherein said determination means determines the relative positions by determining a first overlapping area between the first and second confirmation images.

4. The image synthesizing apparatus according to claim 3, wherein said synthesizing means comprises:

means for detecting a second overlapping area between the first and second images on the basis of the relative positions; and means for combining the first and second images on the basis of the detected second overlapping area.

5. The image synthesizing apparatus according to claim 3 further comprising judging means for judging whether or not the first overlapping area is appropriate.

6. The image synthesizing apparatus according to claim 4 further comprising judging means for judging whether or not the second overlapping area is appropriate.

7. The image synthesizing apparatus according to claim 6 further comprising notification means for notifying a user of a judged result by said judging means.

8. The image synthesizing apparatus according to claim 6 further comprising notification means for notifying a user of a judged result by said judging means.

9. The image synthesizing apparatus according to claim 4, wherein said synthesizing means comprises:

means for roughly obtaining the second overlapping area by magnifying the first overlapping area;

means for extracting pixels which have an edge property as corresponding points in the roughly obtained second overlapping area; and means for obtaining mapping relationship between the first and second images on the basis of a set of extracted corresponding points, wherein said synthesizing means combines the first and second images by transforming either the first image or the second image on the basis of the mapping relationship.

10. The image synthesizing apparatus according to claim 3, wherein said determination means for determining the first overlapping area comprises:

means for identifying a first predetermined number of pixels in the first confirmation image;

means for identifying a second predetermined number of pixels, corresponding to the first predetermined number, in the second confirmation image; and means for determining position relationship between the first and second confirmation images by comparing pixel values of the first predetermined number of pixels and of the second predetermined number of pixels.

11. The image synthesizing apparatus according to claim 10 further comprising:
   means for calculating an overlapping amount of overlapping pixels between the first and second confirmation images on the basis of the determined position relationship of the first and second reduced images; and
   means for judging whether the ratio of the overlapping amount to an area of either the first confirmation image or the second confirmation image is less than a first threshold.

12. The image synthesizing apparatus according to claim 10 further comprising notification means for notifying that the ratio is less than the first threshold to a user as a timing for picking up an image to be synthesized.

13. The image synthesizing apparatus according to claim 12, wherein, when the overlapping amount is less than a second threshold which is smaller than the first threshold, said notification means notifies the user that it is inappropriate timing for picking up an image to be synthesized.

14. An image synthesizing system which synthesizes two images comprising:
   an image rearing apparatus having:
      image pick-up means for sensing an object and obtaining an image; and
      signal processing means for generating and outputting a reduced image obtained by reducing the image in response to a request signal, and outputting the original image,
   an image synthesizing apparatus having:
      reception means for receiving an image signal representing a reduced image of the picked-up image and receiving an image signal representing the picked-up image from the image sensing apparatus;
      determination means for automatically determining and storing relative positions between first and second reduced images received by said reception means; and
      synthesizing means for synthesizing first and second images, corresponding to the first and second reduced images, received by said reception means on the basis of the relative positions determined by and stored in said determination means; and
   displaying means for simultaneously displaying the first and second confirmation images and a synthesized image of the first and second images in such a manner that the relative positions between the first and second reduced images are expressed and a synthesized image of the first and second images,
   wherein the second reduced image is updated at a predetermined interval.

15. The image synthesizing system according to claim 14, wherein the image sensing apparatus and the image synthesizing apparatus are connected via a general-use interface capable of transmitting an image at a high speed.

16. The image synthesizing system according to claim 15, wherein said general-use interface is a bidirectional parallel interface or a SCSI interface.

17. An image synthesizing apparatus comprising:
   reception means for receiving an image signal of a picked-up image from an image pick-up device;
   generation means for generating first and second reduced images on the basis of first and second images received by said reception means;
   determination means for determining relative positions between the first and second reduced images on the basis of an overlapping region between the first and second images;
   displaying means for simultaneously displaying, on a monitor screen, the first and second reduced images in such a manner that the relative positions between the first and second reduced images are expressed on the basis of the relative positions determined by said determination means; and
   synthesizing means for, in response to the displaying means, synthesizing the first and second images on the basis of the relative positions determined by said determination means,
   wherein said second image is updated at a predetermined interval.

18. An image synthesizing apparatus comprising:
   generation means for generating a reduced image of an image sensed by an image pick-up device;
   determination means for automatically determining relative positions between first and second reduced images generated by said generation means on the basis of an overlapping region between the first and second reduced images;
   judging means for judging whether an overlap condition for determining if it is appropriate to synthesize first and second images which are original images of the first and second reduced images is satisfied or not on the basis of the relative positions between the first and second reduced images determined by said determination means; and
   notification means for notifying a user of a judged result.

* * * * *

UNITED STATES PATENT AND TRADEMARK OFFICE
CERTIFICATE OF CORRECTION

PATENT NO. : 6,243,103 B1
DATED : June 5, 2001
INVENTOR(S) : Takiguchi et al.

It is certified that error appears in the above-identified patent and that said Letters Patent is hereby corrected as shown below:

<u>Title page,</u>
Item [54], line 1, delete "PANORAMIC IMAGE GENERATION IN" and insert therefor -- AUTOMATIC DETERMINATION OF TIMING --.
Line 2, delete "DIGITAL PHOTOGRAPHY" and insert therefor -- FOR RECORDING IMAGES USED IN IMAGE SYNTHESIS --.

Signed and Sealed this

Fifteenth Day of January, 2002

Attest:

JAMES E. ROGAN
Attesting Officer     Director of the United States Patent and Trademark Office

UNITED STATES PATENT AND TRADEMARK OFFICE
CERTIFICATE OF CORRECTION

PATENT NO.   : 6,243,103 B1                                                          Page 1 of 1
DATED        : June 5, 2001
INVENTOR(S)  : Takiguchi et al.

It is certified that error appears in the above-identified patent and that said Letters Patent is hereby corrected as shown below:

<u>Title page, Item [54] and Column 1, lines 1 and 2,</u>
Please delete "PANORAMIC IMAGE GENERATION IN DIGITAL PHOTOGRAPHY" and insert therefor -- AUTOMATIC DETERMINATION OF TIMING FOR RECORDING IMAGE USED IN IMAGE SYNTHESIS --.

<u>Column 3,</u>
Line 39, please add -- 1; -- after "FIG."

<u>Column 15,</u>
Line 55, please delete "a." and insert therefor -- <u>a</u>. --

<u>Column 17,</u>
Line 50, please delete "m" and insert therefor -- <u>m</u> --

<u>Column 20,</u>
Line 2, please delete "between" and insert therefor -- of --

Signed and Sealed this

First Day of April, 2003

JAMES E. ROGAN
*Director of the United States Patent and Trademark Office*